(12) United States Patent
Piersol et al.

(10) Patent No.: US 7,809,156 B2
(45) Date of Patent: Oct. 5, 2010

(54) TECHNIQUES FOR GENERATING AND USING A FINGERPRINT FOR AN ARTICLE

(75) Inventors: Kurt Piersol, Campbell, CA (US); Peter E. Hart, Menlo Park, CA (US); Jonathan J. Hull, San Carlos, CA (US)

(73) Assignee: Ricoh Company, Ltd., Tokyo (JP)

( * ) Notice: Subject to any disclaimer, the term of this patent is extended or adjusted under 35 U.S.C. 154(b) by 1014 days.

(21) Appl. No.: 11/495,613

(22) Filed: Jul. 28, 2006

(65) Prior Publication Data

US 2007/0036470 A1 Feb. 15, 2007

Related U.S. Application Data

(60) Provisional application No. 60/708,735, filed on Aug. 15, 2005, provisional application No. 60/707,739, filed on Aug. 12, 2005.

(51) Int. Cl.
*G06K 9/00* (2006.01)
*G06K 9/46* (2006.01)
*G06K 9/20* (2006.01)
*G06K 9/22* (2006.01)

(52) U.S. Cl. ............... 382/100; 382/203; 382/313; 382/317

(58) Field of Classification Search ......... 382/190, 382/195, 103, 101, 313, 305, 317
See application file for complete search history.

(56) References Cited

U.S. PATENT DOCUMENTS 4,974,878 A 12/1990 Josephson
5,486,686 A 1/1996 Zdybel et al.
5,506,663 A * 4/1996 Ulrich et al. ............ 399/151
5,590,197 A 12/1996 Chen et al.

(Continued)

FOREIGN PATENT DOCUMENTS

EP 0 869 652 A2 10/1998

(Continued)

OTHER PUBLICATIONS

European Communication Pursuant to Article 94(3) EPC for European Application No. 07112623.9-2218, Dated Mar. 3, 2009.

(Continued)

*Primary Examiner*—Bhavesh M Mehta
*Assistant Examiner*—Mia M Thomas
(74) *Attorney, Agent, or Firm*—Townsend and Townsend and Crew LLP

(57) ABSTRACT

Techniques for generating fingerprints for articles and using the fingerprints for various applications. Scan-related parameter values, including the area of an article scanned, may be specified and varied from one scan to another for collecting data points used for generating fingerprints for articles. A paper shredder is provided that is configured to, prior to shredding a paper sheet, scan the paper sheet and generate a fingerprint for the paper sheet. Fingerprints may also be generated for media keys that are used to access media data. The fingerprint generated for a media key may be used to authenticate the media key. Access to media data corresponding to the media key may be made contingent on successful authentication of the media key.

26 Claims, 17 Drawing Sheets

U.S. PATENT DOCUMENTS

| | | | |
|---|---|---|---|
| 5,635,012 A * | 6/1997 | Belluci et al. | 156/277 |
| 5,662,039 A * | 9/1997 | Watanabe et al. | 101/116 |
| 5,694,470 A | 12/1997 | Jernbacker | |
| 5,799,098 A * | 8/1998 | Ort et al. | 382/125 |
| 5,815,657 A | 9/1998 | Williams et al. | |
| 5,933,829 A * | 8/1999 | Durst et al. | 1/1 |
| 5,940,507 A | 8/1999 | Cane et al. | |
| 6,023,682 A | 2/2000 | Checchio | |
| 6,108,656 A | 8/2000 | Durst et al. | |
| 6,122,394 A * | 9/2000 | Neukermans et al. | 382/124 |
| 6,163,771 A | 12/2000 | Walker et al. | |
| 6,170,744 B1 | 1/2001 | Lee et al. | |
| 6,189,009 B1 | 2/2001 | Stratigos et al. | |
| 6,193,155 B1 | 2/2001 | Walker et al. | |
| 6,233,340 B1 | 5/2001 | Sandru | |
| 6,330,544 B1 | 12/2001 | Walker et al. | |
| 6,370,514 B1 * | 4/2002 | Messner | 705/14.26 |
| 6,389,151 B1 * | 5/2002 | Carr et al. | 382/100 |
| 6,390,362 B1 | 5/2002 | Martin | |
| 6,422,462 B1 | 7/2002 | Cohen | |
| 6,526,253 B2 * | 2/2003 | Hayashi et al. | 399/391 |
| 6,628,377 B1 * | 9/2003 | Sabatini et al. | 356/71 |
| 6,744,910 B1 * | 6/2004 | McClurg et al. | 382/124 |
| 6,748,424 B1 | 6/2004 | Usuda | |
| 6,755,341 B1 | 6/2004 | Wong et al. | |
| 6,820,803 B1 | 11/2004 | Browning et al. | |
| 6,827,279 B2 * | 12/2004 | Teraura | 235/492 |
| 6,831,682 B1 | 12/2004 | Silverbrook et al. | |
| 6,853,739 B2 * | 2/2005 | Kyle | 382/115 |
| 6,873,430 B2 | 3/2005 | Grasso et al. | |
| 6,917,691 B2 * | 7/2005 | Evans et al. | 382/100 |
| 6,930,803 B1 * | 8/2005 | Suzuki | 358/471 |
| 6,937,989 B2 | 8/2005 | McIntyre et al. | |
| 6,970,573 B2 * | 11/2005 | Carr et al. | 382/100 |
| 6,980,031 B2 * | 12/2005 | Fowler | 326/41 |
| 7,016,524 B2 | 3/2006 | Moore | |
| 7,039,214 B2 * | 5/2006 | Miller et al. | 382/100 |
| 7,080,041 B2 | 7/2006 | Nagel | |
| 7,103,575 B1 | 9/2006 | Linehan | |
| 7,107,457 B2 * | 9/2006 | Harper | 713/182 |
| 7,113,925 B2 | 9/2006 | Waserstein et al. | |
| 7,185,205 B2 | 2/2007 | Launchbury et al. | |
| 7,273,162 B2 * | 9/2007 | Baker | 229/120.13 |
| 7,297,062 B2 * | 11/2007 | Gatto et al. | 463/42 |
| 7,363,505 B2 * | 4/2008 | Black | 713/186 |
| 7,408,575 B2 | 8/2008 | Kawada | |
| 7,424,618 B2 * | 9/2008 | Roy et al. | 713/186 |
| 7,489,807 B2 * | 2/2009 | Hwang et al. | 382/124 |
| 7,593,542 B2 * | 9/2009 | Abe et al. | 382/100 |
| 7,599,580 B2 * | 10/2009 | King et al. | 382/306 |
| 7,603,434 B2 * | 10/2009 | Svendsen | 709/217 |
| 7,712,675 B2 * | 5/2010 | Balinsky et al. | 235/492 |
| 7,731,435 B2 | 6/2010 | Piersol et al. | |
| 2001/0014878 A1 | 8/2001 | Mitra et al. | |
| 2002/0018584 A1 * | 2/2002 | Johnson | 382/125 |
| 2002/0044809 A1 * | 4/2002 | Hayashi et al. | 399/391 |
| 2002/0080387 A1 | 6/2002 | Grasso et al. | |
| 2002/0103764 A1 | 8/2002 | Yen et al. | |
| 2002/0105666 A1 | 8/2002 | Sesek | |
| 2002/0116618 A1 * | 8/2002 | Muratani | 713/176 |
| 2002/0143624 A1 | 10/2002 | Catan | |
| 2003/0001016 A1 | 1/2003 | Fraier et al. | |
| 2003/0028543 A1 | 2/2003 | Dusberger | |
| 2003/0079222 A1 | 4/2003 | Boykin et al. | |
| 2003/0130567 A1 | 7/2003 | Mault et al. | |
| 2003/0135420 A1 * | 7/2003 | Culling et al. | 705/26 |
| 2003/0164879 A1 | 9/2003 | Kitagawa | |
| 2003/0223614 A1 | 12/2003 | Robins et al. | |
| 2004/0143394 A1 | 7/2004 | McIntyre et al. | |
| 2004/0143451 A1 | 7/2004 | McIntyre et al. | |
| 2004/0143552 A1 | 7/2004 | Weichert et al. | |
| 2004/0193571 A1 | 9/2004 | Barrus et al. | |
| 2004/0194026 A1 * | 9/2004 | Barrus et al. | |
| 2004/0196485 A1 | 10/2004 | Hikichi et al. | |
| 2004/0196490 A1 | 10/2004 | Lapstun et al. | |
| 2004/0200901 A1 | 10/2004 | Lebaschi et al. | |
| 2004/0201676 A1 | 10/2004 | Needham | |
| 2004/0205626 A1 | 10/2004 | Klotz, Jr. | |
| 2004/0224670 A1 | 11/2004 | Hull et al. | |
| 2005/0007624 A1 * | 1/2005 | Henry | 358/1.15 |
| 2005/0013462 A1 | 1/2005 | Rhoads | |
| 2005/0021474 A1 | 1/2005 | Geist et al. | |
| 2005/0022008 A1 * | 1/2005 | Goodman et al. | 713/201 |
| 2005/0062851 A1 | 3/2005 | Silverbrook et al. | |
| 2005/0085263 A1 | 4/2005 | Kim et al. | |
| 2005/0114232 A1 | 5/2005 | McIntyre et al. | |
| 2005/0132194 A1 | 6/2005 | Ward | |
| 2005/0171847 A1 | 8/2005 | Ling | |
| 2005/0187792 A1 | 8/2005 | Harper | |
| 2005/0200687 A1 | 9/2005 | Silverbrook et al. | |
| 2005/0200703 A1 | 9/2005 | Kobayashi et al. | |
| 2005/0202804 A1 | 9/2005 | Silverbrook et al. | |
| 2005/0258246 A1 * | 11/2005 | Wolff et al. | 235/454 |
| 2005/0283839 A1 | 12/2005 | Cowburn | |
| 2006/0000900 A1 | 1/2006 | Fernandes | |
| 2006/0012813 A1 | 1/2006 | Lapstun et al. | |
| 2006/0015752 A1 | 1/2006 | Krueger | |
| 2006/0020803 A1 | 1/2006 | O'Hagan | |
| 2006/0025116 A1 | 2/2006 | Silverbrook et al. | |
| 2006/0047977 A1 | 3/2006 | Hanasaki | |
| 2006/0055804 A1 | 3/2006 | Arai et al. | |
| 2006/0056728 A1 | 3/2006 | Silverbrook et al. | |
| 2006/0098900 A1 | 5/2006 | King et al. | |
| 2006/0124722 A1 | 6/2006 | Williams et al. | |
| 2006/0151990 A1 | 7/2006 | Cowburn | |
| 2006/0193004 A1 | 8/2006 | Wasilewski et al. | |
| 2006/0224962 A1 | 10/2006 | Ostojic et al. | |
| 2006/0265590 A1 | 11/2006 | DeYoung et al. | |
| 2006/0294583 A1 | 12/2006 | Cowburn et al. | |
| 2007/0013781 A1 | 1/2007 | Kageyama et al. | |
| 2007/0025619 A1 | 2/2007 | Cowburn et al. | |
| 2007/0027819 A1 | 2/2007 | Cowburn et al. | |
| 2007/0028093 A1 | 2/2007 | Cowburn et al. | |
| 2007/0028107 A1 | 2/2007 | Cowburn et al. | |
| 2007/0028108 A1 | 2/2007 | Cowburn et al. | |
| 2007/0036599 A1 * | 2/2007 | Piersol et al. | 400/76 |
| 2007/0053005 A1 | 3/2007 | Cowburn | |
| 2007/0067248 A1 | 3/2007 | Chatte | |
| 2007/0070218 A1 | 3/2007 | Meijer | |
| 2007/0078685 A1 | 4/2007 | Dettinger et al. | |
| 2007/0113076 A1 | 5/2007 | Cowburn et al. | |
| 2007/0115497 A1 | 5/2007 | Cowburn | |
| 2007/0153078 A1 | 7/2007 | Cowburn | |
| 2007/0164729 A1 | 7/2007 | Cowburn et al. | |
| 2007/0165208 A1 | 7/2007 | Cowburn et al. | |
| 2007/0229678 A1 | 10/2007 | Barrus et al. | |
| 2007/0230703 A1 | 10/2007 | Barrus et al. | |
| 2007/0233612 A1 | 10/2007 | Barrus et al. | |
| 2007/0233613 A1 | 10/2007 | Barrus et al. | |
| 2007/0234215 A1 | 10/2007 | Graham et al. | |
| 2007/0245882 A1 | 10/2007 | Odenwald | |
| 2008/0086421 A1 | 4/2008 | Gilder et al. | |
| 2008/0107271 A1 | 5/2008 | Mergen | |
| 2008/0130038 A1 | 6/2008 | Igarashi | |
| 2008/0141117 A1 | 6/2008 | King et al. | |
| 2008/0240816 A1 | 10/2008 | Piersol et al. | |
| 2008/0243702 A1 | 10/2008 | Hart et al. | |
| 2008/0244721 A1 | 10/2008 | Barrus et al. | |

FOREIGN PATENT DOCUMENTS

| | | |
|---|---|---|
| EP | 1 028 313 A2 | 8/2000 |
| EP | 1 139 649 A2 | 10/2001 |
| EP | 1 202 225 A2 | 5/2002 |

| | | | |
|---|---|---|---|
| EP | 1455284 A2 | 8/2004 |
| EP | 1 507 262 A1 | 2/2005 |
| EP | 1 583 348 A1 | 10/2005 |
| EP | 1 591 952 A1 | 11/2005 |
| EP | 1 840 897 A1 | 10/2007 |
| EP | 1 840 898 A1 | 10/2007 |
| EP | 1 883 039 A1 | 1/2008 |
| EP | 1 975 847 A1 | 10/2008 |
| GB | 2 411 954 | 9/2005 |
| GB | 2 417 074 A | 2/2006 |
| GB | 2 417 707 A | 3/2006 |
| JP | 2004112644 A | 8/2004 |
| JP | 2007-280391 A | 10/2007 |
| JP | 2008-004071 A | 1/2008 |
| JP | 2008-042906 A | 2/2008 |
| JP | 2008-257720 A | 10/2008 |
| JP | 2008-257721 A | 10/2008 |
| WO | WO 98/16884 A1 | 4/1998 |
| WO | WO 01/52473 A1 | 7/2001 |
| WO | WO 02/098671 A2 | 12/2002 |
| WO | WO 2005/088517 | 9/2005 |
| WO | WO 2005/088533 | 9/2005 |
| WO | WO 2006/021383 A1 | 3/2006 |

OTHER PUBLICATIONS

Extended European Search Report mailed Dec. 12, 2007 in European application No. 07113300.3-1228 (corresponding to this case).
European Search Report for European Application 07112623 dated Aug. 17, 2007.
U.S. Appl. No. 11/396,264, filed Mar. 31, 2006, Barrus et al.
U.S. Appl. No. 11/694,088, filed Mar. 30, 2007, Piersol et al.
European Communication Pursuant to Rule 44a EPC for European Application No. 07251463.1-2223, dated Jun. 28, 2007, 10 pages.
European Communication Pursuant to Rule 44a EPC for European Application No. 07105208.8-2223, dated Aug. 7, 2007, 8 pages.
Extended European Search Report for European Application No. 08251133.8-2212, dated Aug. 22, 2008, 5 pages.
European Communication Pursuant to Rule 44a EPC for European Application No. 08251203.9-1228, dated Jun. 23, 2009, 4 pages.
DataCard SP60 Card Printer—Fast, Easy-To-Use, On-Demand Card Issuance, product brochure, 2004, 2 pages, DataCard Corporation, Minnetonka, MN.
Hull et al., "Visualizing Multimedia Content on Paper Documents: Components of Key Frame Selection for Video paper," Proceedings of the 7$^{th}$ International Conference on Document Analysis and Recognition, 2003, 4 pages, IEEE.
"'Fingerprinting' documents and packing—Unique surface imperfections serve as an easily identifiable feature in the fight against fraud."Brief Communications, Jul. 28, 2005, p. 475, vol. 436, Nature Publishing Group.
MP Mini Printers Series—Lowpower Ultra-Compact Printer, product brochure, Sep. 2004, 2 pages, APS.
Nelson et al., "Palette: A Paper Interface for Giving Presentations," CHI '99, 1999, 8 pages.
Newton-Dunn et al., "Block Jam," Conference Abstracts and Applications, Computer Graphics Annual Conference Series 2002, 2002, 2 pages, ACM SIGGRAPH.
Newton-Dunn et al., Block Jam: A Tangible Interface for Interactive Music,: Journal of New Music Research, Feb. 26, 2003, pp. 383-393, vol. 32, No. 4, Swets & Zeitlinger.
"Olympus & Polaroid digital printing camera," Product brochure, Jul. 25, 2000, 3 pages, printed on Apr. 5, 2007 at URL: html://www.dpreview.com/news/0007/00072502c211zoom.asp.
Rekimoto et al., "DataTiles: A Modular Platform for Mixes Physical and Graphical Interactions," SIGCHI '01, Mar. 31-Apr. 4, 2001, 8 pages, ACM, Seattle WA.
Sokoler et al., "Physically Embodied Video Snippets Supporting Collaborative Exploration of Video Material During Design Sessions," NordiCHI Oct. 2002, 2002, 10 pages, ACM, Arhus, Denmark.
Ullmer et al., "mediaBlocks: Tangible Interfaces for Online Media," The Conference Abstracts of CHI '99, May 15-20, 1999, 2 pages, ACM.

Non-Final Office Action for U.S. Appl. No. 11/494,829, mailed May 13, 2009, 21 pages.
Non-Final Office Action for U.S. Appl. No. 11/396,375, mailed Mar. 5, 2009, 12 pages.
Requirement for Restriction/Election for U.S. Appl. No. 11/396,379, mailed Nov. 13, 2008, 6 pages.
Non-Final Office Action for U.S. Appl. No. 11/396,379, mailed Dec. 24, 2008, 10 pages.
Non-Final Office Action for U.S. Appl. No. 11/396,379, mailed Jun. 10, 2009, 12 pages.
Non-Final Office Action for U.S. Appl. No. 11/396,381, mailed Jun. 24, 2009, 24 pages.
Requirement for Restriction/Election for U.S. Appl. No. 11/694,076, mailed Sep. 5, 2008, 6 pages.
Non-Final Office Action for U.S. Appl. No. 11/694,076, mailed Oct. 29, 2008, 21 pages.
Final Office Action for U.S. Appl. No. 11/694,076, mailed Apr. 24, 2009, 24 pages.
Interview Summary for U.S. Appl. No. 11/694,076, mailed Jun. 18, 2009, 2 pages.
"2 Dimensional Bar Code", Internet Archive Wayback Machine, archived on Jan. 24, 2002, 11 pages, at URL: http://web.archive.org/web/20020124190457/www.adams1.com/pub/russadam/stack.html.
Final Office Action for U.S. Appl. No. 11/396,375, mailed on Sep. 1, 2009, 16 pages. (Copy available to the Examiner via PAIR and accordingly not included with this IDS).
Non-Final Office Action for U.S. Appl. No. 11/396,264, mailed on Oct. 29, 2009, 16 pages. (Copy available to the Examiner via PAIR and accordingly not included with this IDS).
Non-Final Office Action for U.S. Appl. No. 11/694,076, mailed on Nov. 2, 2009, 18 pages. (Copy available to the Examiner via PAIR and accordingly not included with this IDS).
Non-Final Office Action for U.S. Appl. No. 11/396,264, mailed on Oct. 29, 2009, 16 pages. (Copy available to the Examiner via PAIR and accordingly not included with this IDS).
Advisory Action for U.S. Appl. No. 11/396,375, mailed on November 18, 2009, 3 pages. (Copy available to the Examiner via PAIR and accordingly not included with this IDS).
Final Office Action for U.S. Appl. No. 11/396,379, mailed on Dec. 15, 2009, 14 pages. (Copy available to the Examiner via PAIR and accordingly not included with this IDS).
Non-Final Office Action for U.S. Appl. No. 11/694,076, mailed on Nov. 2, 2009, 18 pages. (Copy available to the Examiner via PAIR and accordingly not included with this IDS).
Final Office Action for U.S. Appl. No. 11/396,264, mailed on Mar. 31, 2010, 6 pages. (Copy available via PAIR).
Non-Final Office Action for U.S. Appl. No. 11/396,379, mailed on Mar. 26, 2010, 17 pages. (Copy available via PAIR).
Non-Final Office Action for U.S. Appl. No. 11/694,327, mailed on Apr. 13, 2010, 63 pages. (Copy available via PAIR).
Final Office Action for U.S. Appl. No. 11/608,409, mailed on Jun. 9, 2010, 23 pages. (Copy available via PAIR).
Non-Final Office Action for U.S. Appl. No. 11/494,829, mailed on Jun. 8, 2010, 26 pages. (Copy available via PAIR).
Final Office Action for U.S. Appl. No. 11/694,076, mailed on May 10, 2010, 17 pages. (Copy available via PAIR).
Lange et al., "Insight Lab: An Immersive Team Environment Linking Paper, Displays, and Data," Proceedings of the 1998 Conference on Human Factors in Computing Systems, 1998, 8 pages.
Internet Archive Wayback Machine archive of "How Computers Work: The CPU and Memory," available at URL: http://web.archive.org/web/20031215230244/http://homepage.cs.uri.edu/faculty/wolfe/book/Readings/Reading04.htm, archived on Dec. 15, 2003, 7 pages.
Nelson et al., "Palette: A Paper Interface for Giving Presentations," Proceedings of the CHI Conference on Human Factors in Computing Systems, May 1999, 8 pages.
Non-Final Office Action for U.S. Appl. No. 11/396,375, mailed on Feb. 22, 2010, 15 pages. (Copy available via PAIR).
Final Office Action for U.S. Appl. No. 11/396,381, mailed on Dec. 22, 2009, 21 pages. (Copy available via PAIR).

Non-Final Office Action for U.S. Appl. No. 11/608,409, mailed on Jan. 6, 2010, 31 pages. (Copy available via PAIR).

Final Office Action for U.S. Appl. No. 11/494,829, mailed on Dec. 31, 2009, 12 pages. (Copy available via PAIR).

Notice of Allowance for U.S. Appl. No. 11/494,829, mailed on Feb. 24, 2010, 10 pages. (Copy available via PAIR).

* cited by examiner

TECHNIQUES FOR GENERATING AND USING A FINGERPRINT FOR AN ARTICLE

CROSS-REFERENCES TO RELATED APPLICATIONS

The present application claims the benefit and priority under 35 U.S.C. 119(e) from the following provisional applications, the entire contents of which are herein incorporated by reference for all purposes:
(1) U.S. Provisional Application No. 60/707,739, filed Aug. 12, 2005; and
(2) U.S. Provisional Application No. 60/708,735, filed Aug. 15, 2005.

The present application also herein incorporates by reference for all purposes the entire contents of the following applications:
(1) U.S. Non-Provisional Application Ser. No. 11/494,829 entitled "Techniques for Printing With Integrated Paper Sheet Identification" filed Jul. 28, 2006; and
(2) U.S. Non-Provisional Application Ser. No. 11/396,264 filed Mar. 31, 2006.

The present application also herein incorporates by reference for all purposes the entire contents of PCT Publication No. WO 2005/088533, entitled "Authenticity Verification Methods, Products, and Apparatuses" filed Mar. 9, 2005 and published Sep. 22, 2005.

BACKGROUND OF THE INVENTION

The present invention relates to authentication techniques, and more particularly to techniques for generating fingerprints for articles and using the fingerprints to authenticate the articles.

Techniques are known for generating unique fingerprints for articles such as a paper sheet based on inherent characteristics of the paper. An example of one such technique has been developed by Ingenia Technology Limited (ITL) headquartered in London, United Kingdom (www.ingeniatechnology.com). The fingerprint generated for an article may then be used to verify the originality of the article.

BRIEF SUMMARY OF THE INVENTION

Embodiments of the present invention provides techniques for generating fingerprints for articles and using the fingerprints for various applications.

According to an embodiment of the present invention, techniques are provided for processing an article. A set of parameter values are determined. A scanner is then operated using the set of parameter values to obtain a set of data points for the article, the set of data points obtained when a light beam scatters from a surface of the article. A fingerprint is generated for the article based upon the set of data points. Machine readable information is then associated with the article, wherein the set of parameter values are retrievable using the machine readable information.

The data points collected by the scanner represent data captured due to scattering of the light beam by the surface of the article. Since article surfaces are generally unique at the microscopic level, the scatter response of an article is also generally unique to the article. The data points may then be used as a basis for generating a unique fingerprint for the article.

According to an embodiment of the present invention, the fingerprint generated for the article is also retrievable using the machine readable information associated with the article. For example, in one embodiment, the machine readable information may encode the set of parameter values and the fingerprint. In one embodiment, the set of parameter values and the fingerprint may be encrypted prior to being encoded in the machine readable information.

According to an embodiment of the present invention, the set of parameter values may comprise one or more values identifying an area of the article to be scanned. The set of parameter values may identify one or more areas to be scanned. For example, the set of parameter values may specify an area of the article to be scanned that comprises at least a first area and a second area. In one embodiment, the set of parameter values may specify a starting coordinate of the first area and a starting coordinate of the second area.

The set of parameter values may also specify other values related to scan-related parameters such as the intensity of the light beam, an angle of incidence of the light beam to the surface of the article, a position of a detector configured to detect scattering of the light beam from the surface of the article, an area of the article to be scanned, or scan rate.

According to an embodiment of the present invention, determining the set of parameter values comprises using a pseudo-random number generator or a cellular automaton to generate one or more parameter values in the set of parameter values.

According to an embodiment of the present invention, techniques are provided for authenticating an article. Machine readable information associated with the article is read. A set of parameter values is then obtained using the machine readable information, wherein the set of parameter values comprises one or more parameter values used for generating a first fingerprint for the article. A scanner is operated using the set of parameter values to obtain a set of data points for the article, the set of data points obtained when a light beam scatters from a surface of the article. A second fingerprint is generated for the article based upon the set of data points.

In one embodiment, the machine readable information encodes the set of parameter values, and obtaining the set of parameter values comprises determining the set of parameter values from the machine readable information. In another embodiment, the machine readable information encodes the set of parameter values in encrypted form, and determining the set of parameter values from the machine readable information comprises decrypting the encrypted form of the set of parameter values.

According to an embodiment of the present invention, obtaining the set of parameter values comprises using a portion of the machine readable information to access the set of parameter values from a database. In another embodiment, obtaining the set of parameter values comprises hashing a portion of the machine readable information to obtain a hash result, and determining the set of parameter values from the hash result. In yet another embodiment, obtaining the set of parameter values comprises seeding a number sequence generator, generating a first parameter value using the number sequence generator, and generating a second parameter value using the number sequence generator after generating the first parameter value.

According to an embodiment of the present invention, the second fingerprint is compared with the first fingerprint to determine if the second fingerprint matches the first fingerprint. In one embodiment, the first fingerprint is obtained using the machine readable information.

According to an embodiment of the present invention, a method is provided for shredding a paper sheet. A paper sheet to be shredded is received and a fingerprint generated for the paper sheet. A database is searched for an entry comprising a fingerprint that matches the fingerprint generated for the paper sheet. The paper may then be shredded.

According to an embodiment of the present invention, the fingerprint for the paper sheet is generated by scanning a surface of the paper sheet using a light beam, collecting a set of data points obtained when the light beam scatters from the surface of the paper sheet, and generating the fingerprint for the article based upon the set of data points.

According to an embodiment of the present invention, if the database comprises an entry comprising a fingerprint that matches the fingerprint generated for the paper sheet, the entry is updated to indicate that the paper sheet is shredded. If the database does not comprise an entry comprising a fingerprint that matches the fingerprint generated for the paper sheet, an entry is inserted in the database corresponding to the paper sheet to indicate that the paper sheet is shredded.

According to an embodiment of the present invention, a system is provided for shredding paper sheets. The system comprises a feeder adapted to receive a paper sheet for shredding, a fingerprinting unit adapted to generate a fingerprint for the paper sheet, and a shredding unit adapted to shred the paper sheet after the fingerprinting unit has generated a fingerprint for the paper sheet.

According to an embodiment of the present invention, the shredder system is adapted to search a database for an entry comprising a fingerprint that matches the fingerprint generated for the paper sheet. If the database comprises an entry comprising a fingerprint that matches the fingerprint generated for the paper sheet, the entry is updated to indicate that the paper sheet is shredded. If the database does not comprise an entry comprising a fingerprint that matches the fingerprint generated for the paper sheet, an entry is inserted in the database corresponding to the paper sheet to indicate that the paper sheet is shredded.

According to an embodiment of the present invention, techniques are provided for using a media key. Machine readable information is determined from a media key. A data identifier is determined from the machine readable information. A first fingerprint is generated for the media key based upon data points collected from scanning the media key. A second fingerprint is accessed for the media key using the data identifier. In one embodiment, the second fingerprint is generated when the media key was created. The media key is authenticated using the first fingerprint and the second fingerprint. Access to media data corresponding to the media key is provided based upon the authentication of the media key.

In one embodiment, authenticating the media key comprises determining if the first fingerprint matches the second fingerprint, and providing access to the media data comprises providing access to the media data corresponding to the media key if the first fingerprint is determined to match the second fingerprint.

According to an embodiment of the present invention, techniques are provided for using a media key. Machine readable information is determined from the media key. A data identifier is determined from the machine readable information. A first set of scan sites is identified, each scan site in the first set specifying a surface area. For each scan site in the first set, a set of data points is collected for the scan site from scanning a surface area of the media key corresponding to the scan site. The media key is authenticated using the set of data points collected for the scan sites in the first set and data points collected for each of the scan sites in the first set when the media key was created. Access is provided to media data corresponding to the media key based upon the authentication of the media key.

In one embodiment, authenticating the media key comprises, for each scan site in the first set, determining if the data points collected for the scan site match the data points collected for that scan site when the media key was created, and providing access to the media data comprises providing access to the media data corresponding to the media key if, for each scan site in the first set, the data points collected for the scan site match the data points collected for that scan site when the media key was created.

In one embodiment, the first set is a subset of scan sites used when the media key was created. In one embodiment, identifying a first set of scan sites comprises randomly selecting one or more scan sites from scan sites used when the media key was created.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Generating Fingerprints Using Parameter Values

Figure 1A:
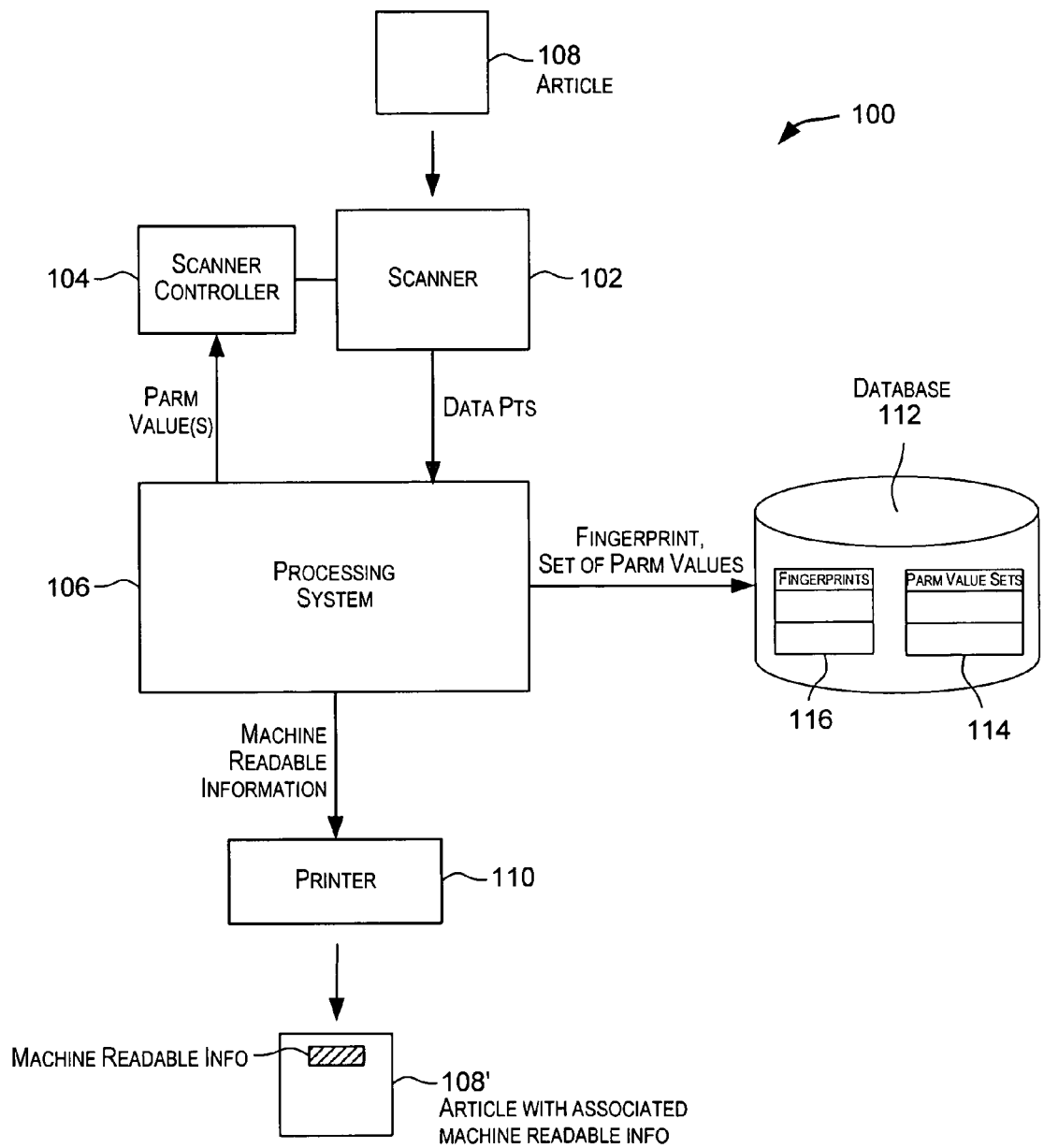
FIG. 1A depicts a simplified system for generating a fingerprint for an article according to an embodiment of the present invention.

FIG. 1A depicts a simplified system 100 for generating a fingerprint for an article according to an embodiment of the present invention. As depicted in FIG. 1A, system 100 comprises a scanner 102, a scanner controller 104, a processing system 106, and optionally a printer 110 and a database 112. The various components depicted in FIG. 1A may be implemented in software (code or instructions executed by a processor), hardware, or combinations thereof.

Scanner 102 is configured to scan and collect data points for an article 108. The data points are then used to generate a fingerprint (or signature) for the article. In one embodiment, scanner 102 is capable of directing a coherent light beam (e.g., a laser beam) onto an area of the surface of article 108. Scanner 102 uses the light beam to scan across the surface of article 108. The area of the article that is impinged by the light beam is herein referred to as the scanned area of the article. Scanner 102 is configured to detect signal components scattered from the scanned area of the article. During a scan, scanner 102 is configured to detect and record a large number of details of the way the light beam is reflected off the surface of article 108. Scanner 102 may comprise a set of one or more detectors that are configured to detect the scattered light signals and collect data points corresponding to the scattering. These detectors are sufficiently sensitive to detect scattered light due to surface irregularities of less than a few hundred nanometers in size.

Due to differences in surfaces of articles at the microscopic level, a unique scatter response is received from each article. Microscopic irregularities on the surface of the article cause the light beam to be scattered differently for different articles. For example, if the article is a paper document, due to the structure of the paper fibers of the document, the paper document surface provides a complex scattering response of the laser beam that is unique and characteristic of the paper document. The scatter response for one paper document may be different from the scatter response from another piece of paper document since, at the microscopic level, the structures of the surfaces are different. The scattered response for an article may thus be used as a basis for generating a fingerprint (or signature) for the article that is unique to the article.

Figure 2:
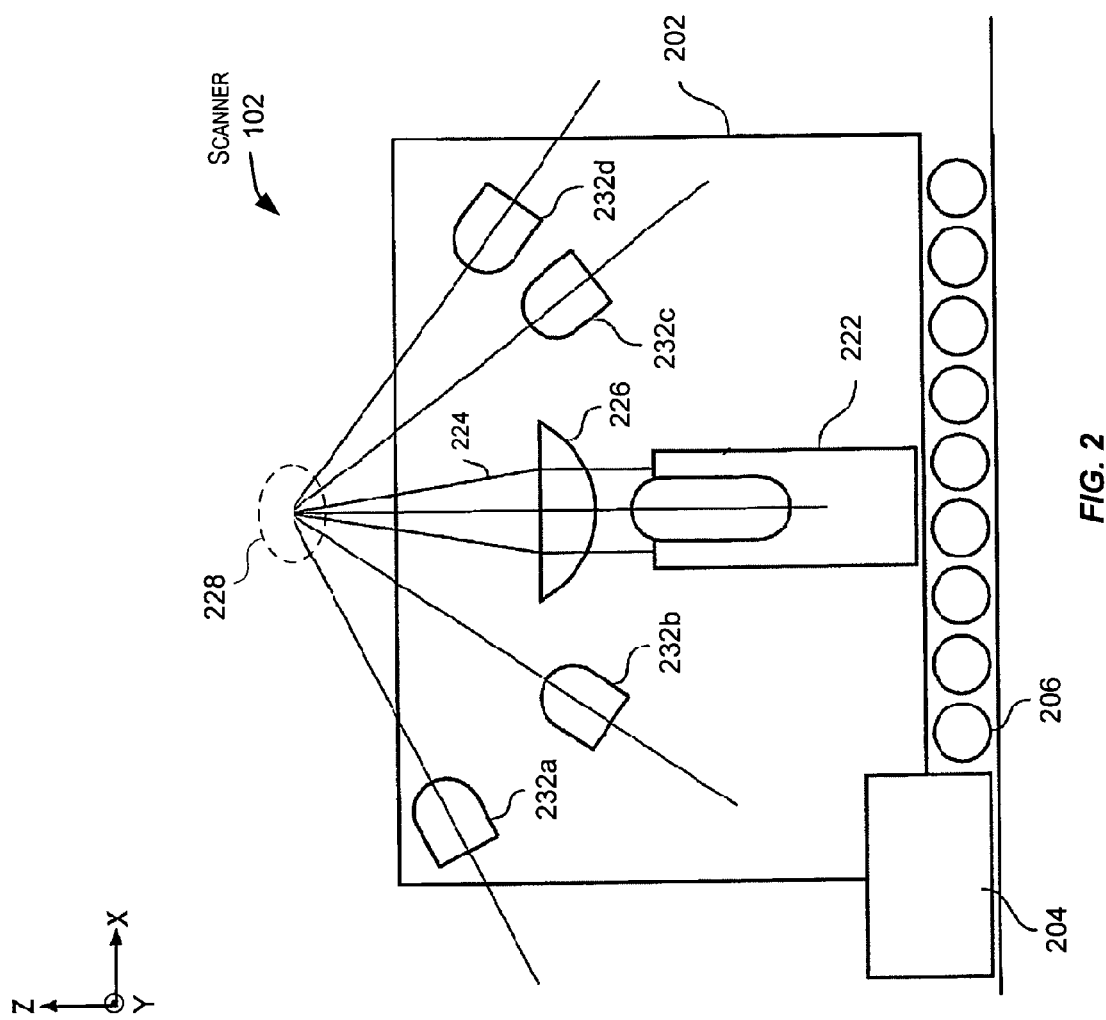
FIG. 2 is a schematic view of an illustrative embodiment of a scanner depicted in FIG. 1A in accordance with an embodiment of the present invention.

FIG. 2 is a schematic view of an illustrative embodiment of a scanner 102 depicted in FIG. 1A in accordance with an embodiment of the present invention. In the embodiment depicted in FIG. 2, the principal optical components of scanner 102 include a laser source 222 for generating a coherent laser beam 224 for scanning an area of a surface of an article. Scanner 102 comprises a detector arrangement 232 comprising a plurality of photodetector elements 232a-232d. Although the specific embodiment illustrated in FIG. 2 shows four photodetector elements, it will be appreciated that other numbers of photodetector elements may be employed. Laser beam 224 is focused by a lens 226 to form an elongate focus extending in the y-direction (perpendicular to the plane of the drawing) and passing through a reading volume 228. The optical components are contained in an optics subassembly 202.

Photodetectors 232a-232d are distributed about the beam at different angles to collect light scattered from a portion of an article present in the reading volume 228, detecting the light scattered by the article when the coherent beam scatters from the reading volume. As illustrated in FIG. 2, laser source 222 directs laser beam 224 with its beam axis parallel to the z-axis (i.e., zero degrees relative to the z-axis). In accordance with an embodiment of the present invention, the laser source 222 can be selectively manipulated to direct the laser beam 224 with its beam axis at a non-zero degree angle relative to the z-axis.

A drive motor 204 is arranged in housing 202 for providing motion of optics subassembly 202 via suitable bearings 206 or other means. Drive motor 204 serves to move the coherent beam and this controls the area of the article that is scanned. Drive motor 204 also controls the speed or rate of the scan.

According to an embodiment of the present invention, the intensity of light beam 224, drive motor 204, and the position of photodetectors 232a-232d are controllable. For example, scanner controller 104 (from FIG. 1) may be configured to control these components of scanner 102.

Some of the basic operations of a scanner such as scanner 102 depicted in FIG. 2 are described in the PCT Publication No. WO 2005/088533, the entire contents of which are herein incorporated by reference for all purposes.

The scanning technique described above is strongly dependent upon the manner in which scanner 102 performs the scan. For example, the data points collected from a scan are strongly dependent upon the scanned area of article 108. Different scanned areas of the same article may yield different data points and thus different fingerprints for the same article. Accordingly, if a first fingerprint has been generated for an article based upon data points collected from scanning a first area of the article, in order to get the same fingerprint during a subsequent scan, the same first area of the article has to be scanned.

The data points collected during a scan are also dependent upon other scan-related parameter associated such as the intensity of the light beam used for the scanning, the angle of incidence of the scanning light beam to the scanned surface, the position of the detectors, the speed of the scan, and other parameters related to the manner in which scanner 102 operates. The values of these parameters affect the manner in which scanner 102 performs a scan and thus affect the data points that are collected by scanner 102. This in turn affects the resultant fingerprint that is based upon the data points.

According to an embodiment of the present invention, processing system 106 is configured to determine values for one more scan-related parameters including values that identify the area of the article surface to be scanned. Processing system 106 may comprise a memory for storing software code or instructions and a processor for executing the software code or instructions. Processing system 106 may also comprise one or more input devices such as a mouse, keyboard, etc. and one or more output devices such as a monitor, audio speakers, etc. In one embodiment, processing system 106 may be incorporated as part of scanner 102 or some of the functionality of processing system 106 may be incorporated into scanner 102.

Processing system 106 may use different techniques to determine a value for a scan-related parameter. In one embodiment, the values for a parameter may be determined such that the parameter does not have the same value for successive scans. In one embodiment, a number generator algorithm may be used. For example, a pseudo-random number generator may be used to generate values for a parameter in order to randomize values for a parameter across multiple scans. A seed and a pseudo-random number generator algorithm may be specified and used. For example, a first set of parameter values may be generated for a first scan specifying a first area of the article surface to be scanned and a second set of parameter values may be generated for a second scan specifying a second area of the article surface to be scanned, wherein the first area is different from the second area. Besides parameter values specifying the scanned area, other scan-related parameter values may also be varied across multiple scans. A cellular automaton technique may also be used to generate values for one or more parameters.

In some embodiments, a user of system 100 may specify the values to be used for one or more scan-related parameters. For example, a user may specify the area of the surface of the article to be scanned. Processing system 106 may provide a user interface that, prior to a scan, enables a user to select one or more scan-related parameters and specify values for the selected parameters.

Combinations of different techniques described above may be used to generate values for the set of parameters to be used for a scan. If a value is not specifically specified for a parameter, then the default value for that parameter value or a value from a previous scan may be used.

Figure 3A:
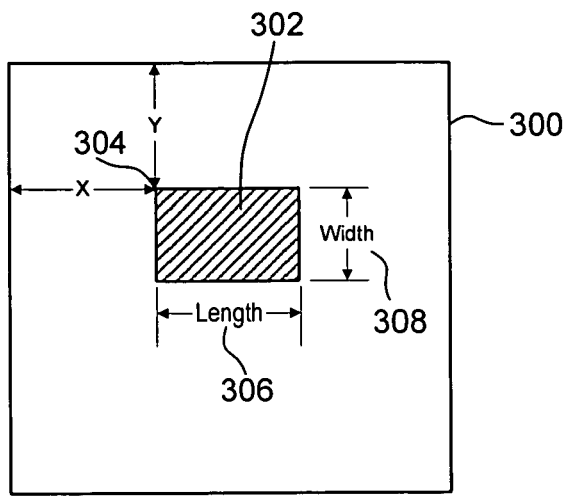
FIGS. 3A, 3B, and 3C depict examples of areas of an article that may be scanned according to an embodiment of the present invention.

According to an embodiment of the present invention, the scan-related parameters for which processing system 106 may generate values include but are not restricted to the values that specify the area of the article surface to be scanned, the intensity of the light beam to be used for scanning, the angle of incidence of the light beam, the positions of one or more detectors that are used to capture data points representative of the scatter response, the speed of the scan, and other like scan-related parameters. Some of these parameters are discussed below:

(a) Area of the article to be scanned—The scan area is generally defined to be at least large enough to generate sufficient data points to generate a robust fingerprint. The area of the article to be scanned may be characterized by various different parameters such as the starting point of the scan area, the length of the scan area, the width of the scan area, and the like. For example, as depicted in FIG. 3A, scan area 302 for article 300 is characterized by a starting (x,y) location 304 corresponding to the top-left corner of the scan area, a length 306, and a width 308. Values for one or more of these parameters may be determined by processing system 106.

Figure 3B:
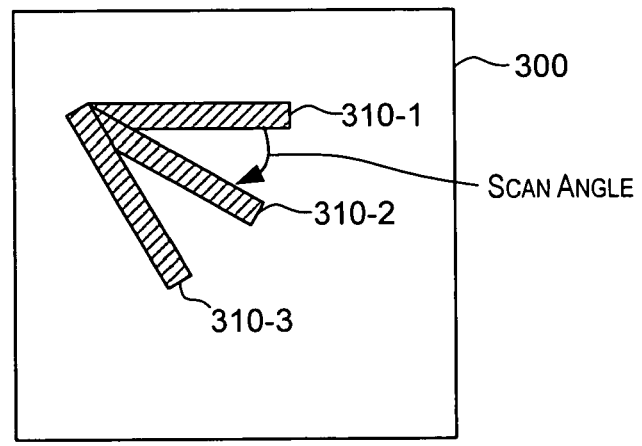

The scan area may also have an angular orientation that may be characterized by a scan angle. For example, as depicted in FIG. 3B, the scan area may comprise three different areas 310-1, 310-2, and 310-3 at a particular scan angle to each other. In one embodiment, when a non-zero value is specified for the scan angle, the angular orientation of scanner 102 may be changed with respect to the article to scan the proper area. If scanner 102 is static, then the orientation of the article may be changed to facilitate the scan. Processing system 106 may use a number sequence generator (e.g., a cellular automaton technique) to choose a sequence of different areas and rotations.

Figure 3C:
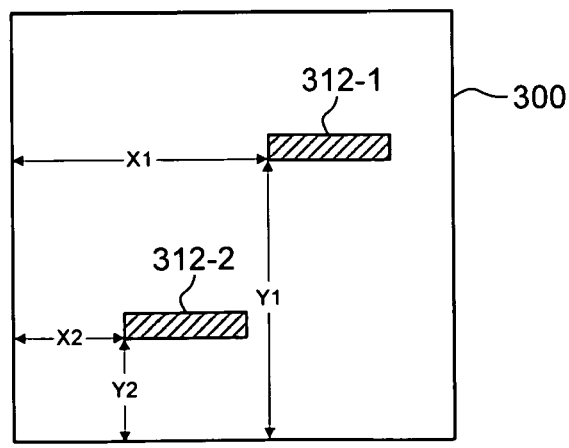

A scan area for an article may comprise of several scan areas that may be contiguous, non-contiguous, partially overlapping, and the like. For example, as depicted in FIG. 3C, the scan area for article 300 comprises two non-contiguous areas 312-1 and 312-2. Each area may be identified by a starting point identified by the lower left corner of the area. The total scan area may be divided evenly or unevenly between the multiple areas. The areas that make up the scan area may be continuous, overlapping, or non-contiguous (as in FIG. 3C). For example, a complete scan area might consist of five partial areas, which accumulate 10%, 30%, 5%, 5%, and 50% of the complete scan area.

Various other techniques may also be used to specify the area of the article to be scanned. For example, mathematical equations and formulae may be specified to identify the area of the article surface to be scanned. Parameter values may be generated corresponding to the equations or formulae.

(b) Intensity of the light beam used for the scanning—Scanner 102 is able to vary the intensity level of the light beam that is used for scanning the article. Accordingly, the intensity level for the light beam may be changed from one scan to another. A parameter value may be generated specifying the intensity level to be used for a scan. In one embodiment, the intensity of the light beam may also be varied during a scan.

(c) Angle of incidence of the light beam—The angle of incidence of the scanning light beam to the surface of the article may also be varied. For example, the light beam may have varying degrees of angle of incidence such as 30°, 40°, 45°, 60°, 90° (i.e., normal to the surface), and the like. A parameter value may be generated specifying the angle of incidence.

(d) Position of detectors used to capture the data points—The position of a detector relative to the scanned surface influences the data points captured by the detector. Accordingly, for a detector, values may be specified that control the location of the detector relative to the scanned surface (or relative to the light beam). The locations of a set of detectors may be controlled as a group or may be controlled on an individual basis. Parameter values may be generated specifying the locations of the one or more detectors of the scanner.

(e) Speed of the scan (or scan rate)—The speed of the scan may be varied. A parameter value may be generated specifying the speed of the scan.

Referring back to FIG. 1A, the set of parameter values determined by processing system 106 are communicated to scanner controller 104. Scanner controller 104 is configured to control scanner 102. For example, scanner controller 104 may control the drive mechanism of scanner 102 such that the scanner scans a surface of the article as specified by the parameter values. Scanner controller 104 ensures that the proper specified scan area of the article is scanned. In some embodiments, scanner 102 itself may be static or stationery. In such an embodiment, the position of the article being scanned may be manipulated such that the proper specified scan area is scanned. Scanner controller 104 is also capable of controlling the intensity of the light beam that is used for a scan, the angle of incidence of the light beam to the article surface, and the position of one or more detectors of the scanner. Scanner controller 104 thus controls the components of scanner 102 based upon scan-related parameter values received from processing system 106. When a value for a parameter has not been specified, scanner controller 104 may use a default value for that parameter in order to complete the scan or a value from a previous scan.

Figure 1B:
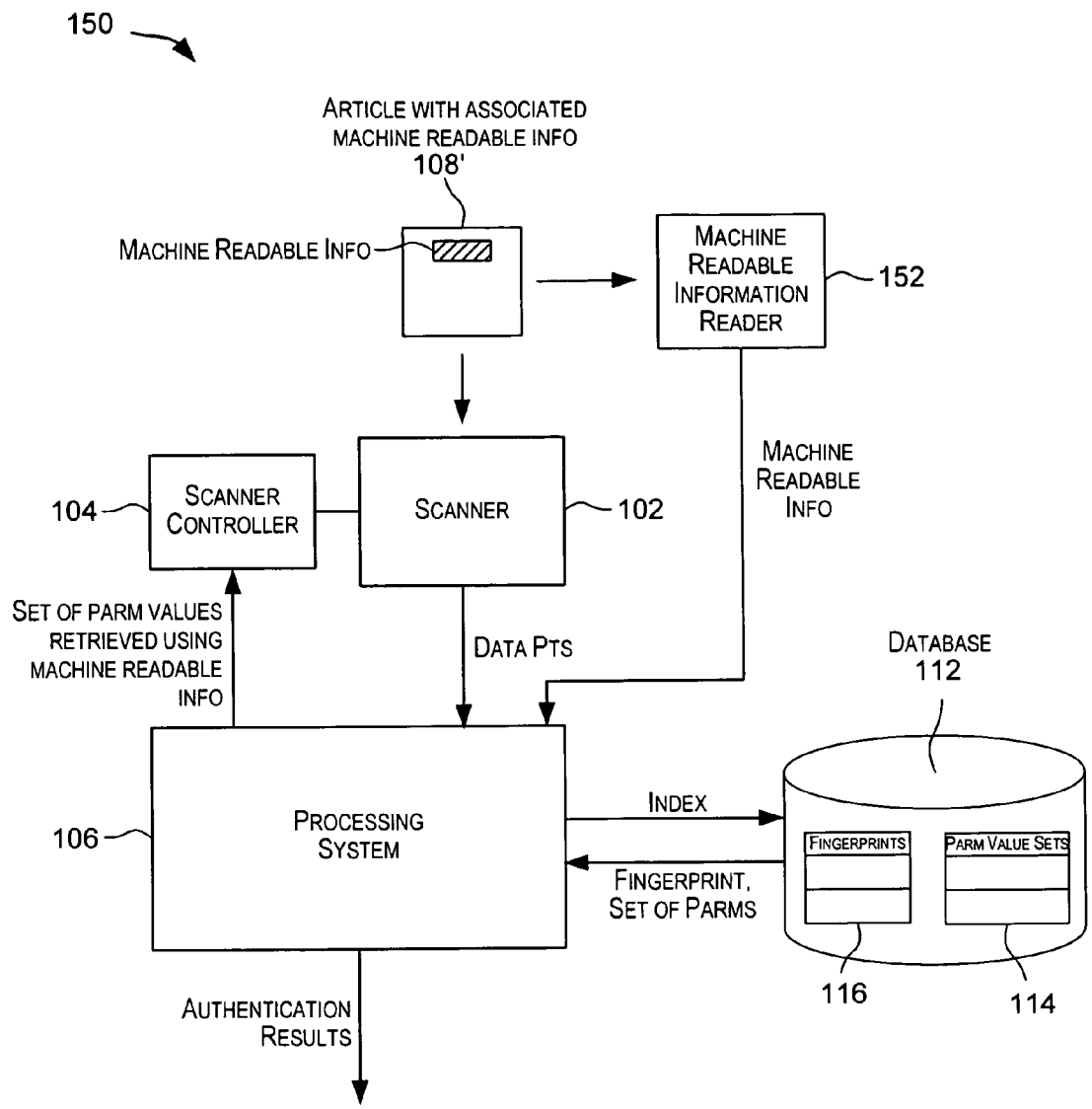
FIG. 1B depicts a simplified system that may be used to authenticate an article according to an embodiment of the present invention.

In one embodiment, as depicted in FIGS. 1A and 1B, scanner controller 104 is implemented as a separate component that is coupled to scanner 102. In an alternative embodiment, scanner controller 104 may be part of scanner 102. In yet other embodiments, scanner controller 104 may be part of processing system 106. In yet other embodiments, functions performed by scanner controller 104 may be split between scanner 102 and processing system 106.

Scanner 102 is configured to perform to scan the article and collect data points representative of the scatter response of the article surface. The operation of scanner 102 may be controlled by scanner controller 104. Scanner controller 104 may use scan-related parameter values received from processing system 106 to control scanner 102. After a scan has been completed, data points detected by the scanner detectors and representative of the scatter response of the article are then communicated from scanner 102 to processing system 106. Since the scatter response is unique and characteristic of the scanned article 108, the data points are used as a basis for generating a fingerprint for the article that can be used to uniquely identify the article.

Processing system 106 is configured to generate a fingerprint for the article based upon data points information received for the article from scanner 102. In one embodiment, a digital fingerprint is generated for the article. An example of a technique for generating a digital fingerprint (or signature) for an article based upon the data points collected from scanning the article surface is described in PCT Publication No. WO 2005/088533, the entire contents of which are herein incorporated by reference for all purposes.

Once a fingerprint for an article has been generated, processing system 106 may store the generated fingerprint for subsequent use. For example, as depicted in FIG. 1A, the fingerprint information generated for an article may be stored in a database 112. Multiple fingerprints generated for multiple articles may be stored, for example in a table 116 in database 112. In one embodiment, the set of parameter values used for controlling scanner 102 for scanning an article may also be stored, for example, in a table 114 in database 112.

In one embodiment, information identifying articles that have been fingerprinted may also be stored. An article identifier may be stored identifying each article. The article identifier for an article may be associated with or linked to a set of parameter values used for generating a fingerprint for that article. The article identifier may also be associated with or linked to the fingerprint generated for that article. Accordingly, an article identifier may be stored such that the article identifier may be used to access a set of parameter values, if any, used to generate a fingerprint for that article, and to access the generated fingerprint.

Database 112 provides a repository for storing information related to fingerprints, article identifiers, set of parameter values, etc. Database 112 may be in different forms such as a file, a data structure, a relational database, an object-oriented database, and the like.

Processing system 106 is configured to generate machine readable information for the article. The machine readable information comprises information that may be used to retrieve the set of parameters values that were used for generating the fingerprint for the article. The machine readable information may also comprise information that may be used to retrieve the fingerprint generated for the article.

In one embodiment, the machine readable information itself encodes the set of parameter values and the fingerprint generated for the article. In another embodiment, the machine readable information comprises information that may be used to access the set of parameter values from database 112. In this embodiment, the machine readable information may also possibly be used to locate the fingerprint generated for the article and stored in database 112. For example, the machine readable information may comprise an article identifier that may be used to retrieve a set of parameter values and a fingerprint from a database.

In one embodiment, the machine readable information may encode encrypted information. For example, information related to the fingerprint and the set of parameter values may be encrypted and then converted to machine readable information. Various encryption techniques such as such as RSA, AES, etc. may be used to perform the encryption.

The machine readable information is associated with the article. Different techniques may be used to associate the machine readable information with the article. According to a first technique, the machine readable information may be printed on the article. For example, as depicted in FIG. 1A, processing system 106 may communicate the machine readable information to a printer 110 that is configured to print the machine readable information on article 108 to create an article 108' having the machine readable information printed on it. Different formats may be used to print the machine readable information (either encrypted or non-encrypted) on the article. For example, the machine readable information may be printed in the form of a barcode, a glyph, etc. In one embodiment, instead of printing the machine readable information directly onto the article, printer 110 may print the machine readable information on a label that may then be affixed to the article.

According to another technique, the machine readable information may be associated with the article by writing the machine readable information to a Radio Frequency Identification (RFID) tag or similar radio enabled storage tag that is then attached to the article, or by updating the memory of an already attached rewritable RFID tag or similar radio enabled storage tag. Various techniques may be used to attach the RFID tag to the article. In some embodiments, the RFID tag may be embedded in the article.

Figure 4:
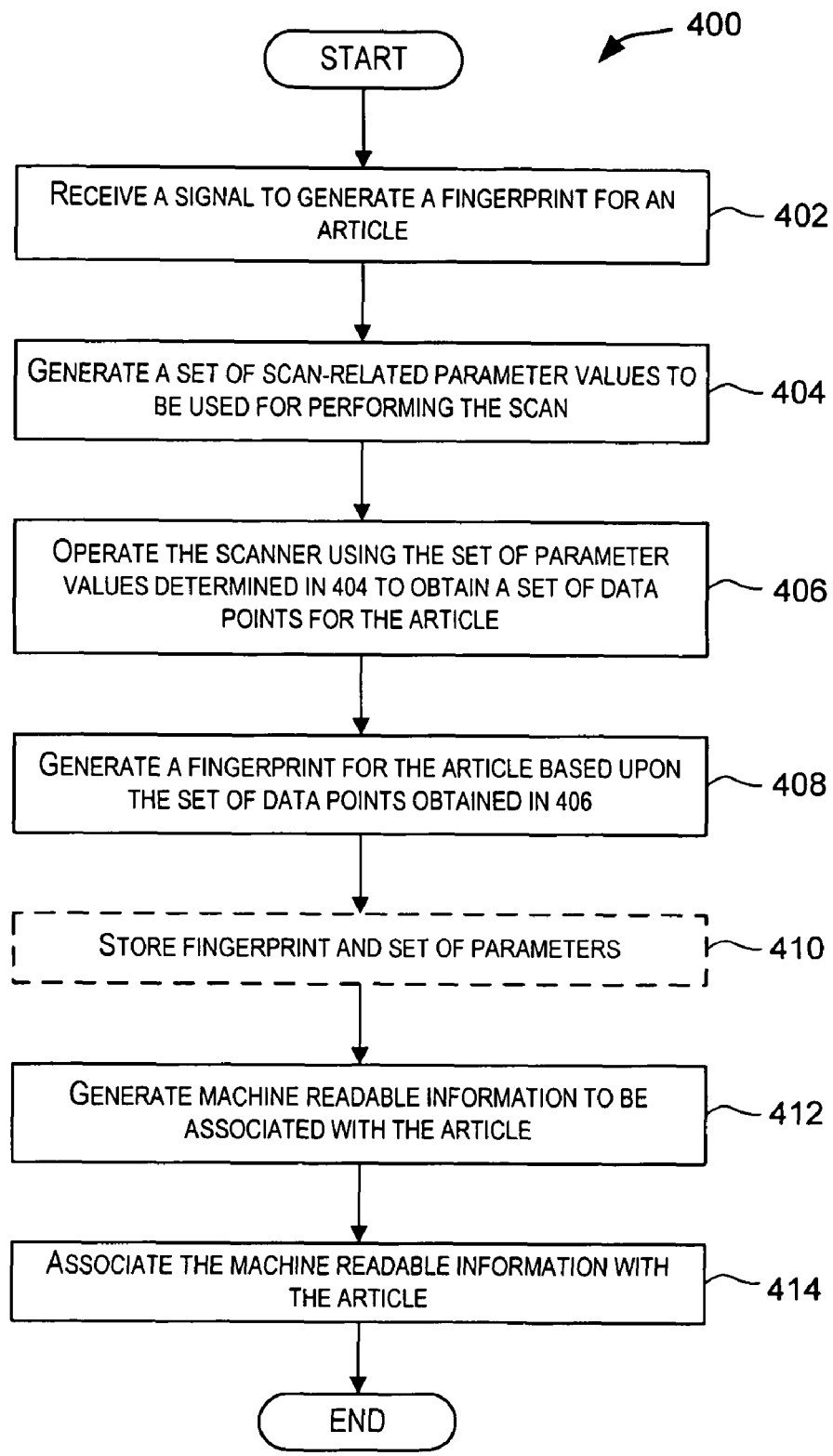
FIG. 4 depicts a simplified flowchart showing a method for determining a fingerprint for an article according to an embodiment of the present invention.

FIG. 4 depicts a simplified flowchart 400 showing a method for determining a fingerprint for an article according to an embodiment of the present invention. The processing depicted in flowchart 400 may be performed by hardware modules, software modules (e.g., code or instructions that may be stored on a computer-readable storage medium) executed by a processor, or combinations thereof.

As depicted in FIG. 4, processing is initiated upon receiving a signal to generate a fingerprint for an article (step 402). For example, the signal may be received by processing system 106 depicted in FIG. 1A. The signal may be manually triggered by a user or may be automatically triggered in response to some event.

A set of scan-related parameter values to be used for scanning the article are then determined (step 404). The set of parameter values determined or generated in 404 may comprise one or more values for one or more scan-related parameters such as the area of the article surface to be scanned, the intensity of the light beam to be used for scanning, the angle of incidence of the light beam, the position of one or more detectors that are used to capture data points representative of the scatter response, the speed of the scan, and other like scan-related parameters. One or more values for one or more scan-related parameters may be determined in 404.

In one embodiment, these values may be automatically determined by processing system 106. For example, values may be determined such that for a parameter, the value for that parameter changes for successive scans. In one embodiment, a pseudo-random number generator may be used to generate values for a parameter in order to randomize values for a parameter across multiple scans. A seed and a pseudo-random number generator algorithm to be used for generating the values may be specified. In another embodiment, a cellular automaton technique may be used to generate values for a parameter. One or more values may also be provided by a user. In one embodiment, the parameter values determined in 406 are not known prior to receiving the signal to generate a fingerprint for the article.

The scanner is then operated using the set of parameter values determined in 404 to obtain a set of data points for the article (step 406). As part of 406, the components of the scanner are operated using the set of parameter values determined in 404. Default values or values from previous scans may be used for parameters for which no values are determined in 404.

The set of data points obtained in 406 are representative of the scatter response of the article. Due to the uniqueness in the surface structure of articles at the microscopic level, a unique scatter response is received from each article. Microscopic irregularities on the surface of the article cause the light beam to be scattered differently for different article scanned surfaces. For example, if the article is a paper document, due to the structure of the paper fibers of the document, the surface provides a complex scattering response of the laser beam that is unique and characteristic of the paper document.

In one embodiment, using the scanner depicted in FIG. 2, the article being scanned is fed into the scanning apparatus. As portions of the article pass through the reading volume 228, the laser beam 224 incident on the surface of the article is scattered due to reflections from the inhomogeneous structures of the intrinsic surface features of the article. The scattered light is detected by the photodetectors 232a-232d. Data is acquired by analog-to-digital conversion of the analog signals output from the photodetectors 232a-232d as they detect the scattered light. The scattered light produced during the scanning operation results in a unique optical response in the output signals of the photodetectors 232a-232d. The unique optical response arises from the unique scattering of incident light as it reflects from the irregular microscopic structures of the surface of the article. For example, articles such as paper possess surface features which at the microscopic level are structures of intermeshing of fibers and other such materials which make up paper, generally referred to as intrinsic structure of the article.

A fingerprint is then generated for the article based upon the set of data points obtained in 406 (step 408). Due to the uniqueness of the scattered response for the article, the data points form a basis for generating a fingerprint (or signature) for the article that is unique to the article and that may be used to unambiguously identify the article and distinguish the article from other articles.

In one embodiment, using the scanner depicted in FIG. 2, the data that is collected from the A/D conversion of the signals from photodetectors 232a-232d is processed to produce a fingerprint, the details of which are outside of the scope of the present invention but are disclosed in PCT Publication No. WO 2005/088533. The data that results from the process uniquely identifies the article, and is referred to herein as the fingerprint or signature for the article In one embodiment, the fingerprint generated in 408 and the set of parameter values used for obtaining the data points that formed the basis for the fingerprint are optionally stored (step 410). For example, the fingerprint and the set of parameter values may be stored in a database. An article identifier identifying the article being fingerprinted may also be stored. The article identifier may be used to access the set of parameter values and fingerprint for the article.

Machine readable information to be associated with the article is then generated (step 412). The machine readable information comprises information that may be used to retrieve the set of parameters values used to operate the scanner in 406. The machine readable information may also comprise information that may be used to retrieve the fingerprint generated for the article in 408. In one embodiment, the machine readable information itself encodes the set of parameter values and the fingerprint generated for the article. In other embodiments, the machine readable information comprises information that may be used to access the set of parameter values (and possibly the fingerprint) from a database.

The machine readable information generated in 412 is then associated with the article (step 414). In some embodiments, the information in machine readable information may be encrypted. Various encryption algorithms such as RSA or AES may be used to perform the encryption.

Different techniques may be used to associate the machine readable information with the article. The machine readable information may be printed on the article or printed on a label that is affixed to the article. The machine readable information may be printed in different formats such as a barcode, a glyph, etc. The machine readable information may be also be associated with the article by writing the machine readable information to a Radio Frequency Identification (RFID) tag or similar radio enabled storage tag that is then attached to the article, or by updating the memory of an already attached rewritable RFID tag or similar radio enabled storage tag.

In the manner described above, a fingerprint may be generated for an article based upon data points collected from scanning the surface of the article using a scanner operating under scan-related parameter values. The fingerprint generated for the article may be used to authenticate the article. The fingerprint generated for the article and which is then used to authenticate the article may be referred to as a reference fingerprint. Authenticity of an article is determined by re-scanning the article to generate a fingerprint for the article and then comparing that fingerprint to the reference fingerprint for the article. If the fingerprint from the re-scan matches the reference fingerprint, then the article is deemed successfully authenticated.

As described above, an embodiment of the present invention provides the ability to generate a set of one or more parameter values (as in step 404) that are then used to control a scanner for collecting data points for generating a reference fingerprint for the article. Further, the set of parameter values that are generated in 404 may be varied for different scans. For example, pseudo-random generators, cellular automatons, or other value generation techniques may be used to generate the parameter values. For example, for generating a reference fingerprint for a first article, a set of parameter values may be generated defining a first scan area (which may comprise of one or more areas of the article surface). For generating a reference fingerprint for a second article, a set of parameter values may be generated defining a second scan area that is different from the first scan area. Likewise, the generation of parameter values in 404 may be controlled such that different scan areas are used for generating the reference fingerprints. In addition to the scanned area, other parameters associated with the scanning process such as the intensity of the light beam used for the scan, the angle of incidence of the light beam to the article surface, the position of the detectors, the speed of the scan, and others may also be varied from one scan to another. This ability to vary the parameter values from one scan to another for generating reference fingerprints helps to prevent fraudulent practices, as described below in further detail.

FIG. 1B depicts a simplified system 150 that may be used to authenticate an article according to an embodiment of the present invention. System 150 depicted in FIG. 1A comprises several systems from system 100 depicted in FIG. 1A. These common systems have been given similar reference numbers and include a scanner 102, a scanner controller 104, a processing system 106, and a database 112. In addition, system 150 comprises a machine readable information reader 152. The various components depicted in FIG. 1B may be implemented in software (code or instructions executed by a processor), hardware, or combinations thereof.

Machine readable information reader 152 is configured to read machine readable information associated with an article 108'. Machine readable information reader 152 may be of different types. For example, if machine readable information is encoded in the form of a barcode that is printed on article 108', then machine readable information reader 152 may be a barcode reader that is capable of reading the barcode and possibly decoding the machine readable information from the barcode. If machine readable information is written to an RFID or other radio enabled storage tag attached to the article, then machine readable information reader 152 may be an RFID reader that is configured to read the tag information. For example, reader 152 may send an interrogation signal to the RFID tag and receive a response signal comprising the machine readable information. Machine readable information reader 152 may forward the machine readable information read from the article to processing system 106 for further processing. In some embodiments, machine readable information reader 152 may be incorporated as part of scanner 102 or part of processing system 106.

As previously indicated, in one embodiment, the machine readable information may be encrypted. Processing system 106 may be configured to access a decryption key and decrypt the encrypted machine readable information using the key. In one embodiment, the decryption key may be a private key of a user.

Processing system 106 is configured to retrieve a set of parameter values for the article using the machine readable information read from the article. The set of parameter values that are retrieved represent the parameter values or a subset thereof used to control the scanner to capture data points that were used to generate the reference fingerprint for the article. In one embodiment, the machine readable information itself may encode the set of parameter values, in which case processing system 106 determines the set of parameter values from the machine readable information. In another embodiment, the machine readable information comprises information (e.g., an index pointing to a database entry) that is then used to retrieve the set of parameter values for the article from a database.

Processing system 106 then communicates the set of parameter values retrieved using the machine readable information to scanner controller 104. Scanner controller 104 uses the values received from processing system 106 to control the operation of scanner 102 and perform a scan of article 108'. It is not necessary that the set of parameter values communicated to scanner controller 104 comprise all the parameter values used for the scan. Default parameter values or parameter values from previous scans may be used for parameters whose values are not specified in the set of parameter values retrieved from the machine readable information. The data points obtained from the scan are then communicated to processing system 106 for generation of a fingerprint for the article.

Processing system 106 then generates a fingerprint for the article based upon the data points captured from scanning the article. This newly generated fingerprint is then used to authenticate the article. In one embodiment, processing system 106 uses the machine readable information to determine a reference fingerprint for the article. In one embodiment, the machine readable information itself may encode the reference fingerprint. In such an embodiment, the reference fingerprint is decoded from the machine readable information and compared to the newly generated fingerprint. The article is considered successfully authenticated or validated if the two fingerprints match. In one embodiment, two fingerprints may be considered to match if the degree of similarity between the two fingerprints is above a user-configurable threshold. Accordingly, the two fingerprints do not have to be exactly matching in order for them to be considered as matching fingerprints.

In some embodiments, instead of the reference fingerprint for the article being encoded in the machine readable information, the machine readable information may be used to access the reference fingerprint for the article from a database. For example, the machine readable information may store an article identifier that may be used to retrieve a reference fingerprint for the article. In other embodiments, the machine readable information may comprise information identifying a location in a database storing the reference fingerprint for the article. The reference fingerprint retrieved from the database may then be compared to the newly generated fingerprint for the article in order to authenticate the article.

In the embodiments described above, it was assumed that the machine readable information associated with the article could be used to retrieve a reference fingerprint for the article. This reference fingerprint is then compared to the newly generated fingerprint for the article in order to authenticate the article. However, in some embodiments, the reference fingerprint for the article may not be identifiable from the machine readable information associated with the article. In such an embodiment, a database may be provided storing a set of reference fingerprints generated for multiple articles. As part of the authentication process, processing system 106 may compare the newly generated fingerprint for the article to reference fingerprints stored in the database to determine if a reference fingerprint from the database matches the newly generated fingerprint. If such a matching fingerprint is found, then the article authentication may be indicated as being successful.

Processing system 106 may then output the results of the authentication. In one embodiment, processing system 106 may comprise one or more output devices (e.g., a monitor) that may be used to output the authentication results. Processing system 106 may also be configured to forward the authentication processing results to another systems for further processing.

Figure 5:
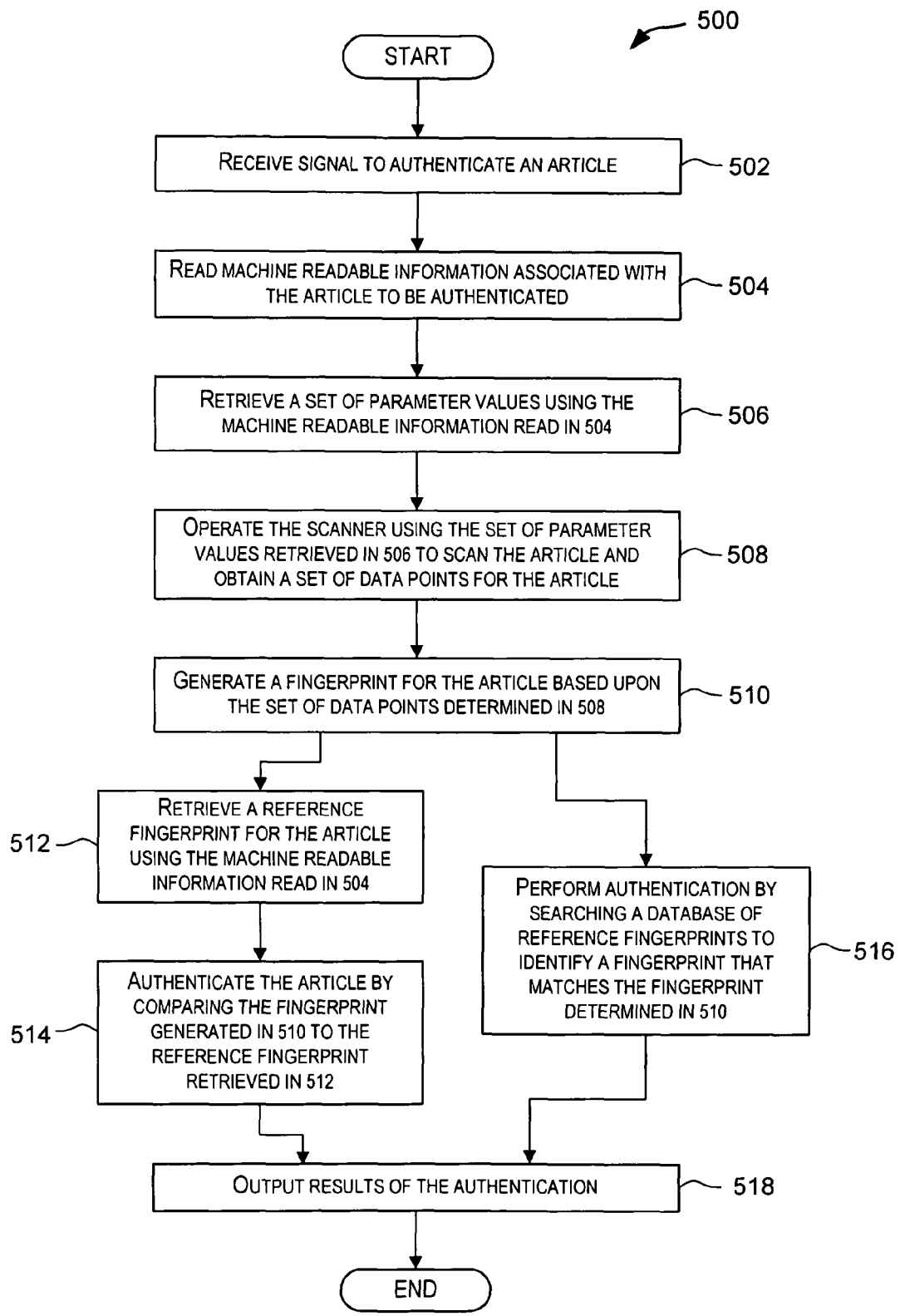
FIG. 5 depicts a simplified flowchart showing a method of authenticating (or verifying or validating) an article according to an embodiment of the present invention.

FIG. 5 depicts a simplified flowchart 500 showing a method of authenticating (or verifying or validating) an article according to an embodiment of the present invention. The processing depicted in flowchart 500 may be performed by hardware modules, software modules (e.g., code or instructions that may be stored on a computer-readable storage medium) executed by a processor, or combinations thereof.

As depicted in FIG. 5, processing is initiated upon receiving a signal to authenticate an article (step 502). For example, the signal may be received by processing system 106. The signal may be manually triggered by a user or may be automatically triggered in response to some event.

The machine readable information associated with the article to be authenticated is then read (step 504). As previously indicated, the machine readable information may be in different forms and may be associated with the article in different ways. For example, if the machine readable information is in the form of a barcode printed on the article, then a barcode reader may be used to read the barcode. If the machine readable information is stored in an RFID or other radio enabled storage tag attached to the article, then an RFID reader may be used to read the machine readable information in 504.

A set of parameter values is then retrieved using the machine readable information read in 504 (step 506). If the machine readable information is in encrypted form, the machine readable information is first decrypted (e.g., using a decryption key) and the decrypted machine readable information then used to retrieve the set of parameter values. The set of parameter values represent parameter values (or a subset thereof) that were used to obtain data points that formed the basis for a reference fingerprint for the article.

There are different ways in which the machine readable information may be used to retrieve the set of parameter values. In one embodiment, the machine readable information itself may encode the set of parameter values, in which case the set of parameter values are retrieved from the machine readable information itself. In another embodiment, the machine readable information may comprise information that may be used to retrieve the set of parameter values for the article from a memory storage such as a database. For example, the machine readable information may provide an index into a database storing the set of parameter values.

A scanner is then operated using the set of parameter values retrieved in 506 to scan the article and obtain a set of data points for the article (step 508). For example, if the set of parameter values identify a specific scan area, then that specific area of the article is scanned in 508.

A fingerprint is then generated for the article based upon the data points obtained in 508 (step 510). The fingerprint is generally a digital fingerprint.

The article is then authenticated using the fingerprint generated in 510. Various different techniques may be used for performing the authentication. In one embodiment, the reference fingerprint for the article is retrieved using the machine readable information read in 504 (step 512). The machine readable information itself may encode the reference fingerprint. In another embodiment, the machine readable information may be used to access the reference fingerprint for the article from a database. For example, the machine readable information may identify an article identifier that may be used to access a reference fingerprint for the article.

Authentication is then performed by comparing the fingerprint generated in 510 to the reference fingerprint retrieved in 512 (step 514). In one embodiment, the article is considered to be successfully authenticated if the fingerprint generated in 510 matches the reference fingerprint retrieved in 512. In one embodiment, two fingerprints may be considered as matching if the degree of similarity between the two fingerprints is above a user-configurable threshold. Accordingly, two fingerprints may be considered as matching even if they do not exactly match.

In another embodiment, authentication is performed by searching a stored set of reference fingerprints to see if the set comprises a fingerprint that matches the fingerprint generated in 510 (step 516). In this embodiment, the article is considered to be successfully authenticated if the stored set of reference fingerprints comprises at least one fingerprint that matches the fingerprint generated in 510.

Results of the authentication process may then be output (step 518). For example, the results may be output via an output device such as a monitor or screen. One or more actions may also be initiated responsive to the authentication results.

As described above, an article is authenticated by comparing a fingerprint obtained for the article with a reference fingerprint for the article or to a set of reference fingerprints. Using the scanning technique described above, each fingerprint for an article is dependent upon the data points obtained from scanning the article that form the basis for generating the fingerprint. These data points are in turn dependent upon the manner in which the scan is performed by the scanner while obtaining the data point. For example, the fingerprints are dependent upon the scanned area of the article and other scan-related parameter values that are used to operate the scanner during a scan. Consequently, in order to have a reliable matching process, it is preferable that the parameter values used at the time of generating the reference fingerprint are also used at the time of generating a subsequent fingerprint that is to be compared to the reference fingerprint. For example, it is preferable that the area of the article scanned is same as the area of the article that is scanned to generate the reference fingerprint. This is facilitated by embodiments of the present invention wherein the machine readable information associated with the article is used to retrieve the set of parameter values used for generating the reference fingerprint. The retrieved set of parameter values may identify the area of the article that was scanned for the generation of the reference fingerprint for the article. The retrieved set of parameter values are then used to control or drive the scanner for obtaining the data points used to generate a fingerprint that is to be compared to the reference fingerprint. Accordingly, the same area of the article is scanned when generating a fingerprint that is to be compared to the reference fingerprint. Accordingly, using the machine readable information to retrieve the set of parameter values increases the accuracy and reliability of the comparison which in turn provides a more robust authentication process.

Figure 6:
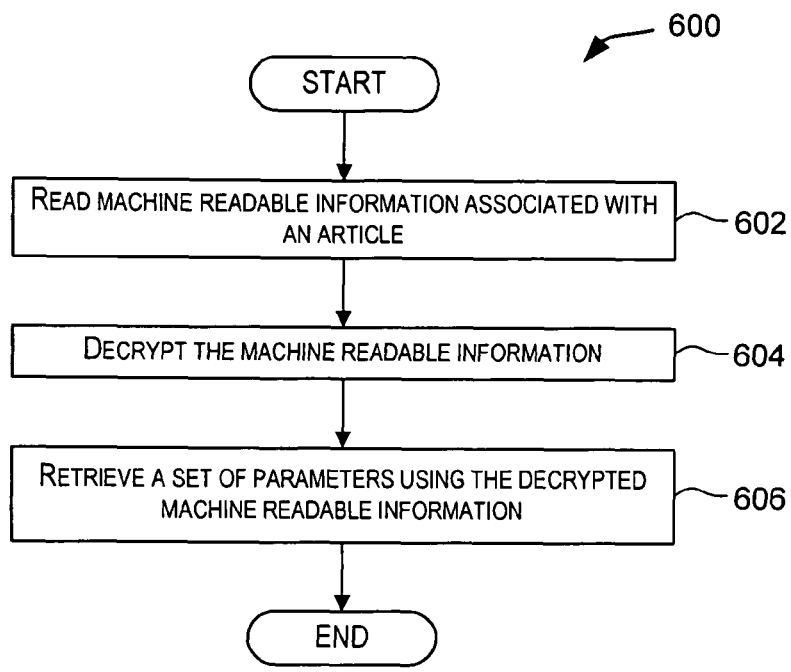
FIG. 6 depicts a simplified flowchart showing processing for retrieving a set of parameter values from machine readable information associated with an article according to an embodiment of the present invention.
Figure 7:
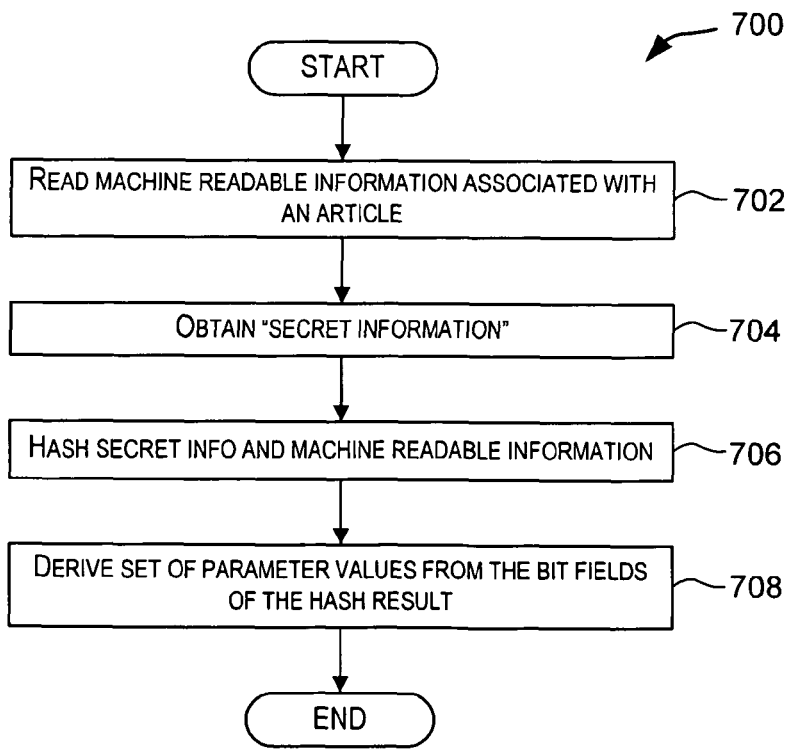
FIG. 7 depicts a simplified flowchart showing a method of retrieving a set of parameter values from machine readable information associated with an article using a hash according to an embodiment of the present invention.
Figure 8:
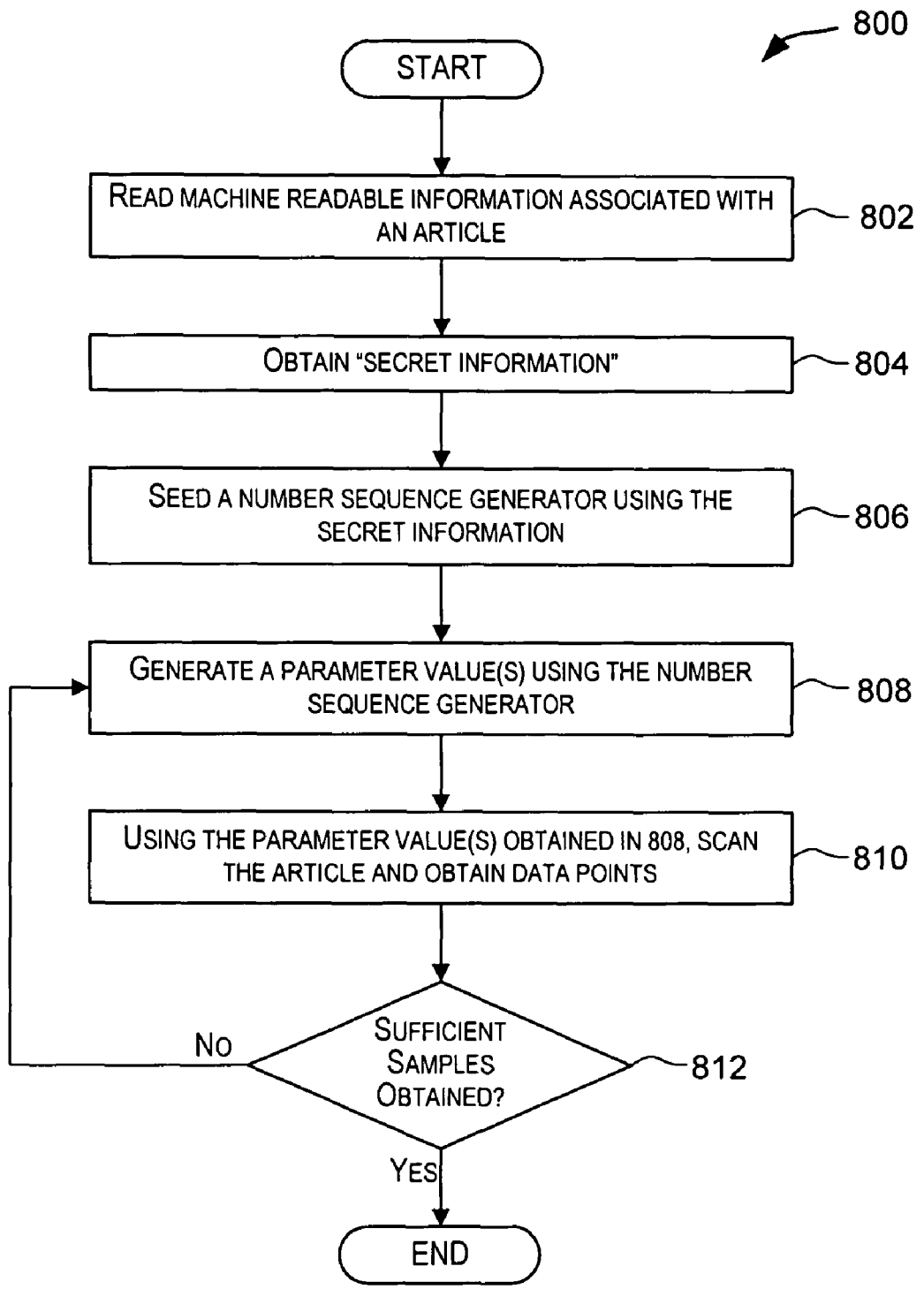
FIG. 8 depicts a simplified flowchart showing a method for retrieving a set of parameter values from machine readable information associated with an article using a number sequence generator according to an embodiment of the present invention.

As described above, the machine readable information associated with an article is used to retrieve a set of parameter values that are used to scan the article. FIGS. 6, 7, and 8 depict various examples of how the machine readable information may be used to retrieve a set of parameter values according to embodiments of the present invention. FIG. 6 depicts a simplified flowchart 600 showing processing for retrieving a set of parameter values from machine readable information associated with an article according to an embodiment of the present invention. The processing depicted in flowchart 600 may be performed by hardware modules, software modules (e.g., code or instructions that may be stored on a computer-readable storage medium) executed by a processor, or combinations thereof.

Machine readable information associated with an article is read (step 602). The embodiment depicted in FIG. 6 assumes that the machine readable information is encrypted. Accordingly, the machine readable information read in 602 is decrypted (step 604). A decryption key may be accessed and used to decrypt the encrypted information. In one embodiment, the processing system may query a database to obtain a decryption key and then use the key to decrypt the machine readable information. A set of parameter values are then be retrieved using the decrypted machine readable information (step 606). In one embodiment, the decrypted machine readable information may itself encode the set of parameter values. In another embodiment, the decrypted machine readable information may be used to retrieve a set of parameter values from a database.

The set of parameter values obtained in 606 may then be used to drive a scanner to collect data points that are then used to generate a fingerprint for the article. For example, the set of parameter values retrieved in 606 may identify an (x,y) starting location of an area of the article surface to be scanned. Scanner controller 104 may control the movement of the scanner such that the scan is started from the specified (x,y) location. In embodiments where the scanner is static, the article may be manipulated such that the scanner is able to start the scan from the specified (x,y) location.

FIG. 7 depicts a simplified flowchart 700 showing a method of retrieving a set of parameter values from machine readable information associated with an article using a hash according to an embodiment of the present invention. The processing depicted in flowchart 700 may be performed by hardware modules, software modules (e.g., code or instructions that may be stored on a computer-readable storage medium) executed by a processor, or combinations thereof. Machine readable information associated with an article is read (step 702). The machine readable information may then be hashed to determine a set of parameter values. In one embodiment, to improve security and to prevent unauthorized retrieval of the set of parameter values, the hashing may use both the machine readable information and "secret information" that is available only to authorized persons or processes. Accordingly, as part of the processing the secret information is obtained (step 704). The secret information may be a code, string, key, etc. that is available only to an authorized person or process. The secret information may be accessed from a database. In one embodiment, the secret information may be obtained from a database using information from the machine readable information.

The secret information and the machine readable information are then hashed to obtain a hash result (step 706). Various hashing techniques may be used. The set of parameter values is then derived from the hash result (step 708). For example, in one embodiment, the hash result may be a bit string which may be divided into one or more bit fields, with each bit field corresponding to a parameter value. In this manner, the hash result may encode one or more parameter values such as values for the start location of a scan, a scan angle, different areas making up the scan area, etc. The parameter values obtained from the hash result may then be used to drive the scanner.

The embodiment described in FIG. 7 uses secret information to perform the hash. In an alternative embodiment, the secret information may not be used. In this embodiment, the machine readable information or a portion thereof may be hashed and the hash result used to derive the set of parameter values.

FIG. 8 depicts a simplified flowchart 800 showing a method for retrieving a set of parameter values from machine readable information associated with an article using a number sequence generator according to an embodiment of the present invention. The processing depicted in flowchart 800 may be performed by hardware modules, software modules (e.g., code or instructions that may be stored on a computer-readable storage medium) executed by a processor, or combinations thereof.

Machine readable information associated with an article is read (step 802). In one embodiment, in order to prevent unauthorized retrieval of the set of parameter values using the machine readable information, "secret information" that is available only to authorized persons or processes is used. Accordingly, as part of the processing the secret information is obtained (step 804). The secret information may be a code, string, key, etc. that is available only to an authorized person or process. The secret information may be accessed from a database. In one embodiment, the secret information may be obtained from a database using information from the machine readable information.

The secret information is then used to seed a number sequence generator (step 806). The number sequence generator may be a pseudo-random number generator, a cellular automaton, or some other technique. In one embodiment, the secret information itself acts as a seed for the number sequence generator. In other embodiments, a seed value may be generated using the secret information.

A set of one or more parameter values may be generated using the number sequence generator (step 808). The one or more parameter values generated in 808 may then be used to drive the scanner to scan the article and obtain a set of data points (step 810). A check may then be made if the data points already obtained are sufficient to generate a robust fingerprint for the article (step 812). If the data points are deemed to be sufficient, then processing ends. If the data points are not sufficient, then another set of one or more parameter values are obtained using the number sequence generator according to step 808. The scanner is then driven using the newly obtained set of parameter values and data points obtained from scanning the article according to step 810. In this manner, steps 808, 810, and 812 are repeated until sufficient data points have been obtained for generating a robust fingerprint for the article.

As described above, a number sequence generator may be used to generate a sequence of numbers that are used as parameter values. For example, if the area of the article to be scanned comprises of multiple areas as shown in FIG. 3C, the first run of the number sequence generator may output parameter values that define the first area and the next run of the number sequence generator may output parameter values that define the second area. For example, the first run may output starting location values x1 and y1, and the second run may output starting location values x2 and y2. In a similar manner, starting location values may be output for multiple areas making up the area to be scanned for a fingerprint thereby allowing complex scanner positions to be specified. In alternative embodiments, the number sequences may be used as values for other types of parameters.

Various techniques have been described above for retrieving a set of parameter values from machine readable information associated with an article. Combinations of the above-described techniques may also be used.

As described above, an article is authenticated by comparing a fingerprint obtained by scanning the article with a previously generated reference fingerprint for the article. Further, according to the scanning techniques described above, the fingerprint for an article is dependent upon the data points that form the basis for a fingerprint. These data points are in turn dependent upon physical structure of the scanned surface of the article and the manner in which the scanner is operated during the scan. For example, the data points are dependent upon the area (or areas) of the article that is scanned and used to collect data points. For example, for a paper document, the fingerprint is strongly dependent upon the particular area of the paper scanned. If a reference fingerprint has been generated for the paper document by scanning a particular surface of the paper document, that same particular surface needs to be scanned when the paper document is subsequently authenticated in order for the subsequently obtained fingerprint to match the reference fingerprint for the paper document.

Due to this dependence upon the physical structure of the article surface and the area scanned, one may try to "fool" the authentication process by attempting to change the physical structure of the article surface that is scanned for collecting the data points. For example, if a person wanted to obscure the identity of a paper document, the person may attempt to do so by abrading the section of the paper surface that is used for scanning and collecting data points that form the basis for a fingerprint for the paper document such that the fingerprint resulting from the abraded surface is different from the reference fingerprint previously generated for the paper document prior to abrasion from the same surface area. In order to know which area of the paper document to abrade, the person has to know the area of the paper document that was used for scanning and generating the reference fingerprint (or else one could abrade the entire document, but presumably this also destroys the value of the paper document and is not something the person desires). In the past, it was relatively easy for a person to determine the surface area of an article that was used for generating a reference fingerprint since conventional scanners used a fixed area of the article surface for the scan. The same area was used for successive scans. Due to this a person could easily determine the scanned area and abrade this area in an attempt to "fool" the authentication process.

Embodiments of the present invention overcome the aforementioned limitations of conventional scanners. As described above, according to an embodiment of the present invention, when generating a reference fingerprint for an article, a set of parameter values may be generated and used to control the scanner to collect data points that form the basis for the reference fingerprint. The generation of the parameter values may be controlled such that one or more parameter values are changed from one scan to another when generating reference fingerprints. For example, pseudo-random generators, cellular automatons, or other value generation techniques may be used to generate the parameter values.

Accordingly, the area of an article surface that is scanned to collect the data points for generating a reference fingerprint for the article may be varied from one scan to another. For example, for generating a reference fingerprint for a first article, a set of parameter values may be generated defining a first scan area (which may comprise of one or more areas of the article surface) and for generating a reference fingerprint for a second article, a second set of parameter values may be generated defining a second scan area that is different from the first scan area.

There are different ways in which the scan area may be changed. This may be done by changing the starting point of the scan area, the scan angle, the length and/or width of the scan area, the number of sub-areas that make up the scan area, the locations or sizes of the sub-areas, etc. In addition to the scanned area, other parameters associated with the scanning process such as the intensity of the light beam used for the scan, the angle of incidence of the light beam to the article surface, the position of the detectors, the speed of the scan, and others may also be varied for multiple scans.

By varying the scanning-related parameter values as discussed above, embodiments of the present invention make it difficult for a person who wants to "fool" the authentication process to know what parameter values were used for generating a reference fingerprint for a particular article. For example, since the scan area used for generating the fingerprint is not fixed and may be varied, the person does not know and cannot easily determine the area of the particle article that was used for determining the fingerprint for the particular article. If the person does not know the scan area of the article, then the person does not know which area of the article to abrade in order to fool the system (assuming that abrading the entire document destroys the value of the paper document to the person and is not something the person desires). Thus, the ability to vary the parameter values from one scan to another for generating reference fingerprints helps combat fraudulent practices.

Further, while the scan parameter values may be varied for generating fingerprints, a set of parameter values used for a particular article are retrievable using machine readable information associated with the article and may be used for subsequent scans of the article when the article is being authenticated. Accordingly, the reliability of the authentication process is maintained.

Shredder with Fingerprint Capability

The fingerprinting capability, as discussed above, may be incorporated and used in many different devices and applications. In one embodiment, the fingerprinting capability may be incorporated into a paper shredder. Before a paper sheet is shredded, the shredder may be configured to generate a fingerprint for the paper sheet and store information indicating that the particular paper sheet is being shredded.

Figure 9:
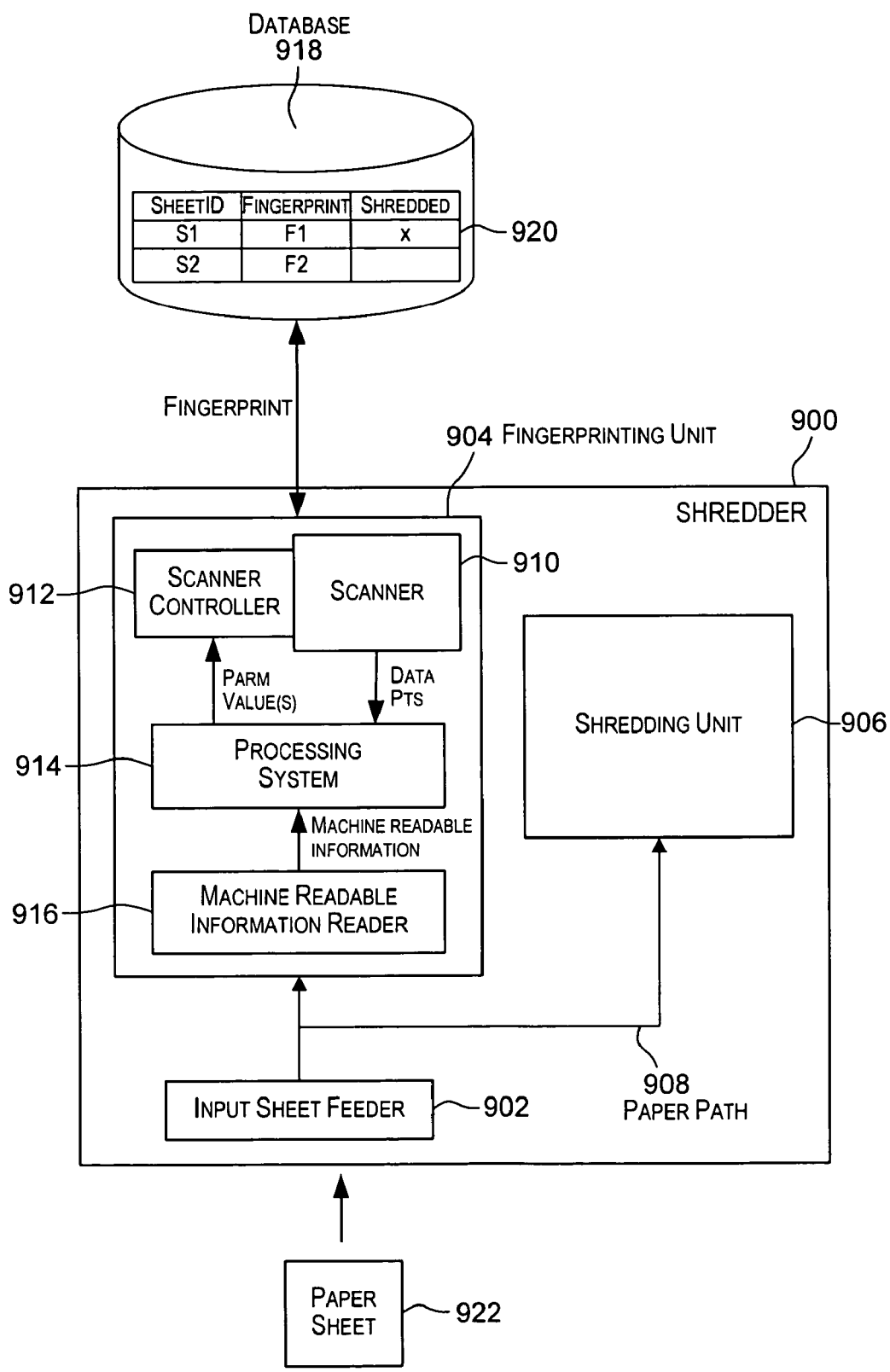
FIG. 9 is a simplified block diagram of a shredder according to an embodiment of the present invention.

FIG. 9 is a simplified block diagram of a shredder 900 according to an embodiment of the present invention. As depicted in FIG. 9, shredder 900 comprises an input sheet feeder 902, a fingerprinting unit 904, and a shredding unit 906. Shredder 900 is configured to shred one or more paper sheets 922 fed to shredder 900 via input sheet feeder 902. Input sheet feeder 902 provides an interface for feeding paper sheets 922 to be shredded to shredder 900.

Once a paper sheet 922 has been fed to feeder 902, reference 908 marks the paper path of the paper sheet within shredder 900. In one embodiment, a paper sheet is first provided to fingerprinting unit 904 to generate a fingerprint for the paper sheet before being sent to shredding unit 906 for shredding.

Fingerprinting unit 904 is configured to generate a fingerprint for the paper sheet according to the techniques discussed above. In the embodiment depicted in FIG. 9, fingerprinting unit comprises a scanner 910, a scanner controller 912, a processing system 914 and a machine readable information reader 916. Scanner 910 is configured to scan the paper sheet and collect data points that are used for generating a fingerprint (or signature) for the paper sheet. The data points may be provided to processing system 914 for generation of the fingerprint. In one embodiment, scanner 910 performs functions similar to those performed by scanner 102 depicted in FIGS. 1A and 1B.

Scanner controller 912 is configured to control the operation of scanner 910. For example, scanner controller 912 may receive one or more parameter values from processing system 914 and cause scanner 910 to scan the paper sheet using the received parameter values. In one embodiment, scanner controller 912 performs functions similar to those performed by scanner controller 104 depicted in FIGS. 1A and 1B.

Machine readable information reader 916 is configured to read machine readable information, if any, associated with the paper sheet to be shredded. Reader 916 may be configured to read information in different formats such as a barcode, information stored on an RFID tag, etc. The read information is then communicated to processing system 914 for further processing. In one embodiment, reader 916 performs functions similar to those performed by reader 152 depicted in FIG. 1B.

Processing system 914 is configured to receive machine readable information from reader 916, determine a set of parameter values, if any, from the machine readable information and communicate the set of parameter values to scanner controller 912. Processing system 914 is configured to receive data points collected by scanner 910 from scanning the paper sheet to be shredded and generate a fingerprint for the paper sheet based upon the data points. Processing system 914 is configured to compare the fingerprint generated for the paper sheet with existing fingerprints stored in a database 918 to find a matching fingerprint in database 918. For a matching database entry, processing system 914 may update the entry to indicate that the paper sheet is shredded. If a matching entry is not found, then processing system 914 may add an entry to database 918 corresponding to the paper sheet to be shredded and indicate that the sheet is shredded.

Database 918 provides a repository for storing a collection of fingerprints generated for one or more paper sheets. Database may be a relational database, an object-oriented database, a file, etc. that is capable of storing information. In one embodiment, database 918 may store information identifying paper sheets, fingerprints corresponding to the paper sheets, and information indicating whether the paper sheets have been shredded. For example, as depicted in FIG. 9, database 918 may store a table 920 with each entry in the table comprising information ("SheetID") identifying a paper sheet, a fingerprint ("Fingerprint") for the paper sheet, and information ("Shredded") indicating whether or not the paper sheet has been shredded. An "x" in the last column of the table indicates that the corresponding paper sheet has been shredded. The information "SheetID" identifying a paper sheet may comprise an image of the paper sheet, a filename of the paper sheet, etc. In one embodiment, the "SheetID" information may also identify a document of which the paper sheet is a member. In one embodiment, a separate column may be provided for identifying documents corresponding to the paper sheets.

Table 920 may be searched by fingerprinting unit 904 to find an entry in the table comprising a fingerprint that matches a fingerprint generated by fingerprinting unit 904 for a paper sheet to be shredded. For a matching entry, fingerprinting unit 904 may update the last column of the matching entry to indicate that the paper sheet has been shredded. If no matching entry is found, then fingerprinting unit 904 may add a new entry to the table for the paper sheet to be shredded and indicate that the paper sheet is shredded. The added entry is particularly valuable when the generator of a document and the shredder have independent databases, which are occasionally cross-checked. In such cases, the shredder database is unlikely to know whether the document has been previously fingerprinted or not, but a cross-check can be made between the two databases at a later time.

In one embodiment, the information stored in database 918 may also indicate whether it is permissible to shred the particular paper sheet. For a paper sheet received by shredder 900 for shredding, if an entry in database 918 comprises a fingerprint that matches the fingerprint generated by fingerprinting unit 904 for the paper sheet, and the matching entry indicates that it is not permissible to shred the paper sheet, then shredder may not shred the particular paper sheet.

Shredding unit 906 is configured to shred the paper sheet 922 fed to shredder 900. In one embodiment, shredding unit receives the paper sheet after the fingerprint analysis for the paper sheet has been performed by fingerprinting unit 906. Shredding unit 906 may be configured to not shred a particular paper sheet if the fingerprinting analysis performed by fingerprinting unit 904 indicates that shredding of the paper sheet is not permitted.

Figure 10:
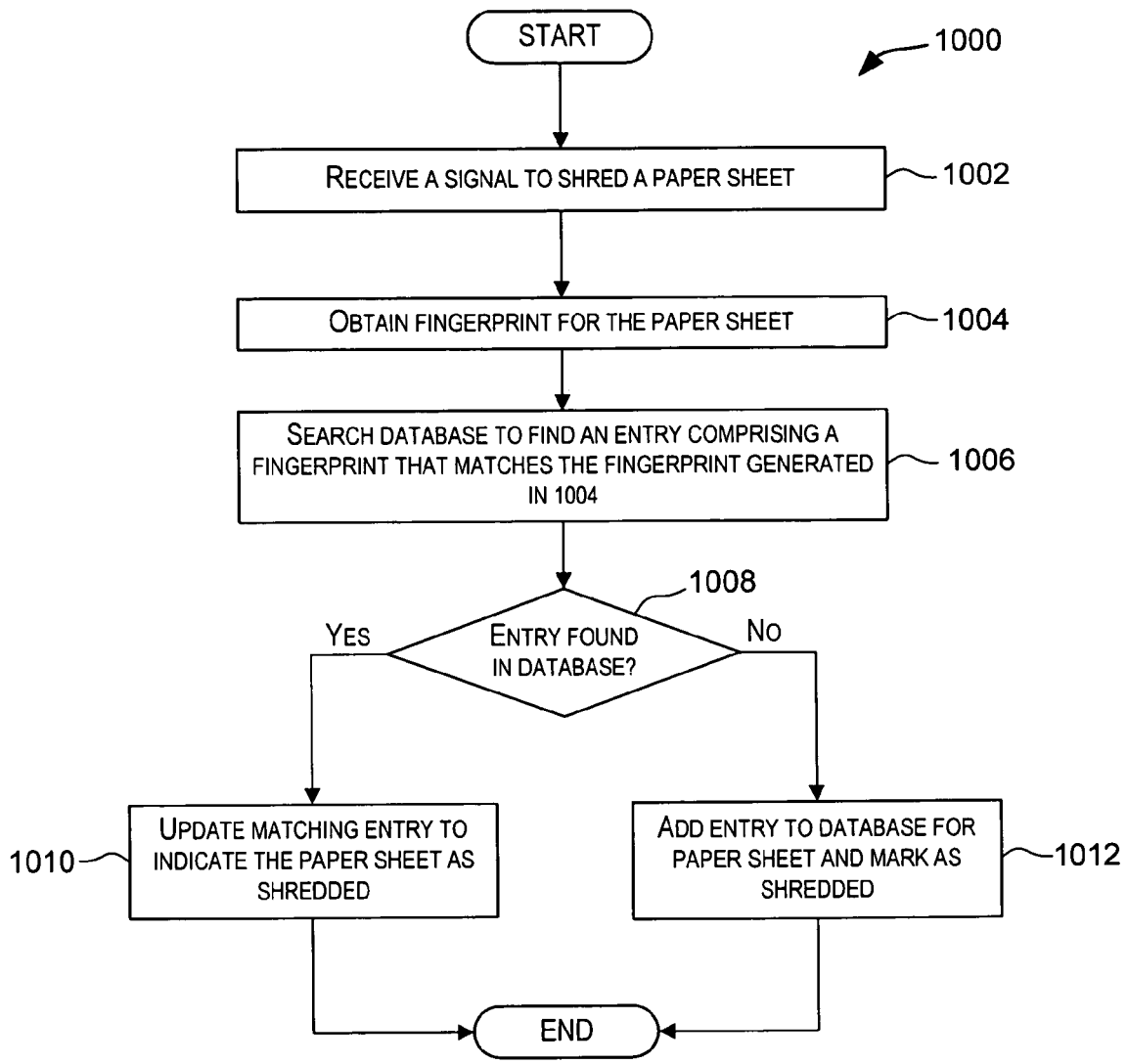
FIG. 10 depicts a simplified flowchart showing a method of shredding a paper sheet according to an embodiment of the present invention.

FIG. 10 depicts a simplified flowchart 1000 showing a method of shredding a paper sheet according to an embodiment of the present invention. The processing depicted in flowchart 1000 may be performed by hardware modules of a shredder, software modules (e.g., code or instructions that may be stored on a computer-readable storage medium) executed by a processor of the shredder, or combinations thereof.

As depicted in FIG. 10, processing is initiated upon receiving a signal to shred a paper sheet (step 1002). In one embodiment, the signal may be received when a paper sheet is fed to shredder 900 via input sheet feeder 902.

The fingerprinting unit then obtains a fingerprint for the paper sheet to be shredded (step 1004). Various functions may be performed in order to generate a fingerprint for the paper sheet. If machine readable information is associated with the paper sheet, then that machine readable information is read by reader 916 and provided to processing system 914. Processing system 914 may derive a set of parameter values from the machine readable information and forward them to scanner controller 912. Scanner controller 912 may then operate scanner 910 using the parameter value. Data points captured by scanner 910 from scanning the paper sheet may be forwarded to processing system 914 which generates a fingerprint for the paper sheet based upon the data points.

In some embodiments, the machine readable information may not specify any parameter values. The paper sheet to be shredded may not even have any machine readable information associated with it. In these embodiments, scanner 910 may operate using a default set of parameter values to obtain the data points from scanning the paper sheet to be shredded. These data points may then be used by processing system 914 to generate a fingerprint for the paper sheet.

A database is then searched to find a fingerprint that matches the fingerprint generated for the paper sheet in 1004 (step 1006). In one embodiment, a database is searched to find an entry in the database that comprises a fingerprint that matches the fingerprint generated for the paper sheet in 1004. The two fingerprints may be considered as matching if the degree of similarity between the two fingerprints exceeds some user-configurable threshold.

A check is then made if a matching entry is found (step 1008). If a matching database entry is found, then the entry is updated to indicate that the paper sheet is being shredded (step 1010). The matching entry may also comprise information that is used to identify the paper sheet being shredded. The information may also identify a document of which the paper sheet is a part. If no entry is found, then a new entry may be inserted into the database corresponding to the paper sheet and updated to indicate that the paper sheet is shredded (step 1012). In the manner described above, paper sheets are identified prior to shredding and a record is stored of paper sheets that have been shredded.

Media Keys and Fingerprints

The fingerprinting techniques described above may be used in conjunction with various applications. For example, the fingerprinting techniques may be used to authenticate articles such as paper sheets, cards, etc. In one embodiment, the fingerprinting techniques may be used to validate media keys that facilitate access to media data stored on a server or some other storage location. Description related to media keys is provided in U.S. application Ser. No. 11/396,264 filed Mar. 31, 2006, the entire contents of which are herein incorporated by reference for all purposes.

A media key is generated for media data. A media key created for specific media data facilitates access to the specific media data. A media key thus serves as a token that can be used to access media data for which the media key has been created. A user may use a media key to access the media data corresponding to the media key and possibly perform operations on the media data. Media keys facilitate distribution, sharing, accessing, outputting, creating, and/or performing other operations on media data.

A media key may be created from a paper sheet or from other material. Fingerprinting techniques, as discussed above, may be used to authenticate or verify the media key. In this manner, by using the fingerprinting techniques discussed above with media keys, it is possible to create media keys that can be verified and authenticated. This provides a cheap and secure method for providing access to data in a verifiable way.

The media data for which a media key is created may comprise one or more different types of information including but not restricted to audio information, video information, image information, slide information, text information, etc. or combinations thereof. For example, media data may comprise a video clip, an audio clip, a movie, a photo, a slide, a document, contact information, business card information, a presentation (e.g., a Microsoft PowerPoint presentation), etc. or combinations or collections thereof.

Figure 11:
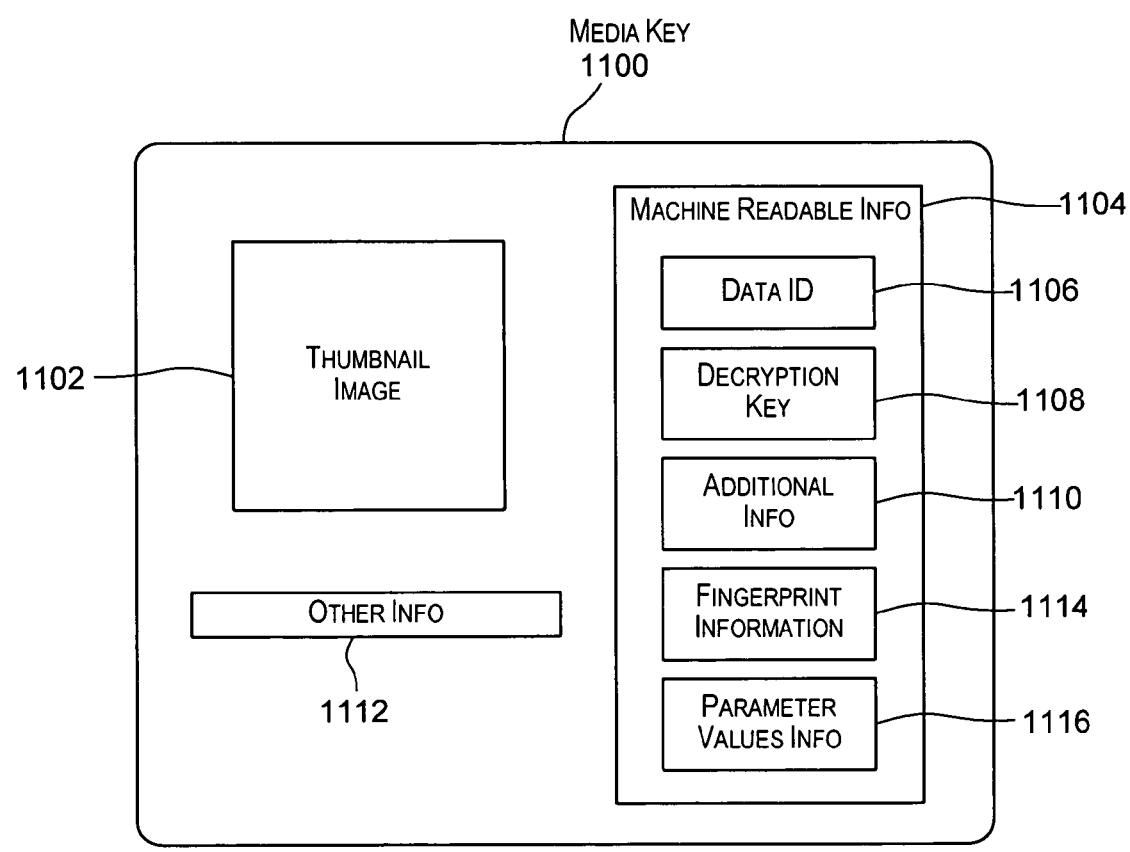
FIG. 11 depicts a media key according to an embodiment of the present invention.

FIG. 11 depicts a media key 1100 according to an embodiment of the present invention. Media key 1100 may be generated for some media data that may be stored in some storage location, such as on a server. Different forms of media keys may be generated. Media key 1100 depicted in FIG. 11 comprises a thumbnail image 1102 and machine readable information 1104. Thumbnail image 1102 may provide a visual human-readable indication of the contents of the media data for which the media key is created. For example, if the media key is created for a digital image, then thumbnail image 1102 may be a representation of the image. As another example, if the media key is created for a song audio clip, then thumbnail image 1102 may comprise the title of the song, information about the singer, artwork for album in which the song appears, or some other information related to the song that a human may use to determine the contents of the media data for which the media key is created. As another example, if the media data for which the media key is created comprises a collection of photos, then thumbnail image 1102 may depict a collection of photos. Thumbnail image 1102 thus provides a visual indication of the one or more media items included in the media data for which the media key is created. In this manner, thumbnail image 1102 provides a visual cue to a user as to the contents of the media data for which the media key is created. The presence of thumbnail image 1102 on media key 1100 is optional.

Machine readable information 1104 comprises information that can be read by a machine and used to access media data corresponding to the media key. Machine readable information 1104 may comprise text, an image, a symbol, a barcode, a glyph, bits, and the like, and combinations thereof.

Different techniques may be used to associate machine readable information 1104 with media key 1100. In one embodiment, the machine readable information may be printed on the media key. For example, a machine readable identifier (e.g., in the form of a barcode) may be generated and printed on a paper sheet that serves as the media key. In other embodiments, the machine readable information may be stored in a Radio Frequency Identifier (RFID) tag or similar radio enabled storage tag that is then attached to the article, or by updating the memory of an already attached rewritable RFID tag or similar radio enabled storage tag. For example, an RFID tag may be glued to the media key, stapled to the media key, pinned to the media key, or even embedded in the media key. Other techniques may also be used to associate the machine readable information with a media key.

Machine readable information 1104 may comprise various pieces of information. As depicted in FIG. 11, machine readable information 1104 comprises a data identifier 1106, a decryption key 1108, fingerprint information 1114, parameter values information 1116, and possibly additional information 1110. Data identifier 1106 may be used to access the media data for which the media key has been created. For example, if the media data corresponding to the media key is stored as a file on a server, data identifier 1106 may be used to locate the file on the server.

Different techniques may be used to generate a data identifier 1106 for a media key. According to one technique, the data identifier for a media key is generated based upon the media data for which the media key is created. For example, a cryptographic hash (e.g., an MD5 hash, an SHA1 hash) may be applied to the media data for which the media key is being created to generate the data identifier for the media key. Using a cryptographic hash prevents collisions in data identifiers. Other attributes of the media data may also be used to generate a data identifier for the media data. Examples of such attributes include but are not restricted to date or time when the media data was created, a user name, etc. and combinations thereof.

A data identifier for media data may also be generated using information not related to the media data. For example, techniques that are capable of generating unique values may also be used to generate a data identifier. In some instances, a data identifier may be generated prior to capture or identification of the media data. For example, a list of pre-determined data identifiers may be provided and a data identifier from the list may be assigned to media data at the time of creating a media key for the media data.

The data identifier may be generated by different systems. In one embodiment, the data identifier may be generated by the server on which the media data is stored. In another embodiment, an identifier generator system/service may be used to generate a data identifier. In another embodiment, data identifier 1106 may be generated by the system or device that is used for creating a media key. Any of the techniques described above may be used to generate the data identifier. For example, a system configured to create media keys may apply a cryptographic hash (e.g., an MD5 hash, SHA1 hash) to the media data for which a media key is being created to generate the data identifier. The data identifier may then be formatted as machine readable information 1104 that is associated with media key 1100 during generation of the media key.

The media data corresponding to a media key may be stored in encrypted form. In such an embodiment, machine readable information 1104 may comprise a decryption key 1108 that may be used to decrypt the encrypted media data. If the media data is encrypted using a symmetrical encryption technique, then the decryption key is the same as the encryption key that is used to encrypt the media data.

Machine readable information 1104 may also optionally comprise additional information 1110. Additional information 1110 may comprise information related to the media data such as metadata or other contextual information for the media data. For example, additional information 1110 may identify the storage location (e.g., identify a server) where the media data corresponding to the media key is stored. In such an embodiment, additional information 1110 may be used to access the media data corresponding to the media key. Additional information 1110 may also identify the media data type (e.g., audio data, video data, etc.). This information may be useful for identifying an application or output device for outputting the media data. Additional information 1110 may also comprise other types of information such as information identifying an action/command to be performed using the media data, workflow information, etc. Additional information 1110 may also comprise information that is specific to applications that are configured to perform operations on the media data. For example, additional information 1110 may identify an application that is used to create the media key, which user created the media key, date when the media key was created, etc.

According to an embodiment of the present invention, machine readable information 1114 may comprise fingerprint information 1114 that may be used to retrieve a reference fingerprint generated for the media key. Fingerprint information 1114 may encode the reference fingerprint itself or may comprise information that may be used to retrieve a stored reference fingerprint for the media key.

According to an embodiment of the present invention, parameter values information 1116 may comprise information that may be used to determine a set of scan-related parameter values to be used for operating a scanner when data points for a fingerprint are captured. Parameter values information 1116 may itself encode a set of parameter values or may be used to retrieve a stored set of parameter values representing parameter values used when a reference fingerprint was generated for the media key.

In addition to thumbnail image 1120 and machine readable information 1104, other information 1112 may also be printed on media key 1100. Information 1112 may include different types of information and may be human-readable. For example, in one embodiment, other information 1112 may identify the type of media data or the media item(s) included in the media data corresponding to the media key. For example, for a media key created for a photo, other information 1112 may state "Photo". This provides information to the user of the media key as to the nature of the contents of the media data corresponding to the media key. As previously described, a media key may be created for media data comprising a collection of media items (e.g., a collection of photos). In this case, other information 1112 may state "Collection". In the case of a collection, other information 1112 may also possibly indicate the number of media items in the collection. Other information 1112 may also include other types of information such as information identifying a storage location (e.g., a directory location) or filename of the corresponding media data, characteristics about the media data, etc. Other information 1112 may also identify the primary mime-type of the media data, the date or time when the media key (or corresponding media data) was created or shared.

A media key, such as media key 1100 depicted in FIG. 11, may be created as a physical object using a paper sheet, a piece of plastic, or some other article. A media key may take different forms. Different layouts may be used to print information on a media key. When a media key is used to access media data corresponding to the media key, the fingerprint generated for the media key enables the media key to be validated or authenticated prior to providing access to the corresponding media data. In one embodiment, access to the media data is permitted only if the media key is successfully authenticated.

Figure 12:
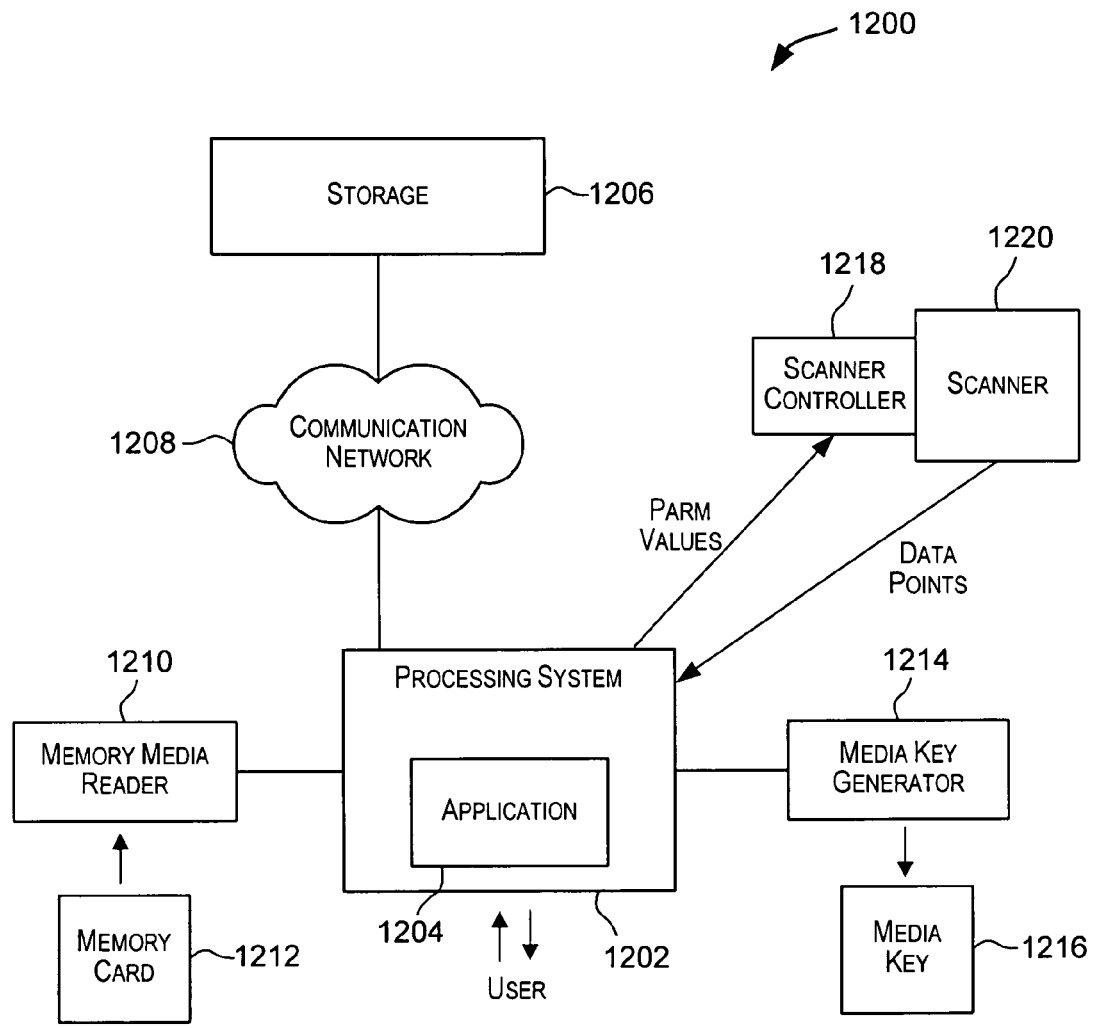
FIG. 12 is a simplified block diagram of a system that may be used to generate media keys according to an embodiment of the present invention.

FIG. 12 is a simplified block diagram of a system 1200 that may be used to generate media keys according to an embodiment of the present invention. System 1200 depicted in FIG. 12 is merely illustrative of an embodiment incorporating the present invention and is not intended to limit the scope of the invention as recited in the claims. One of ordinary skill in the art would recognize other variations, modifications, and alternatives.

As depicted in FIG. 12, a processing system 1202 is configured to process creation of media keys. Processing system 1202 may also perform processing for generating a fingerprint for the media key that is generated. Processing system 1202 may comprise a processor and a memory subsystem and possibly other subsystems. The processor may execute software code or instructions. In one embodiment, an application 1204 executing on processing system 1202 may enable a user to initiate generation of media keys. The user may interact with application 1204 via input devices (e.g., mouse, keyboard) of processing system 1202. For example, the user may select the media data for which a media key is to be created using a mouse connected to processing system 1202. Application 1204 may then use the user-provided information to initiate generation of a media key. Information may be output to the user via one or more output devices of processing system 1202.

The media data selected for media key creation may be stored locally or remotely from processing system 1202. For example, the media data may be stored in storage 1206 that may be coupled to processing system 1202 via communication network 1208. Storage 1206 may comprise one or more servers storing data.

Communication network 1208 may be a local area network (LAN), a wide area network (WAN), a wireless network, an Intranet, the Internet, a private network, a public network, a switched network, or any other suitable communication network. Communication network 1208 may comprise many interconnected computer systems (which may also store the media data) and communication links such as hardwire links, optical links, satellite or other wireless communications links, wave propagation links, or any other mechanisms for communication of information. Various communication protocols may be used to facilitate communication of information via communication network 1208, including TCP/IP, HTTP protocols, extensible markup language (XML), wireless application protocol (WAP), protocols under development by industry standard organizations, vendor-specific protocols, customized protocols, and others.

The media data selected for creating a media key may also be stored by processing system 1202 or on some memory storage media such as memory cards, disks, drives, CDs, DVDs, etc. A media reader 1210 may be coupled to processing system 1202 that is capable of reading the media data from such storage media. Memory media reader 1210 may be configured to accept a memory medium such as a memory card 1212 and read data stored on the memory card. The data stored on the card may be displayed to the user by application 1204 and the user may then select the data for which a media key is to be created. In one embodiment, the selected data may be uploaded to some server from the removable memory media.

Processing system 1202 may create or determine a unique data identifier for the media data for which the media key is to be generated. The data identifier that is determined is such that it can be used to access the media data for which the media key is being created. The data identifier may be of any length greater than zero. In one embodiment, the data identifier is 128 bits long.

In one embodiment, the data identifier for the media data is generated by processing system 1202. Processing system 1202 may be configured to create the data identifier based upon the selected media data. For example, in one embodiment, processing system 1202 may apply a cryptographic hashing algorithm (e.g., an MD5 hash) to the media data which results in the generation of a unique data identifier for the data. In this manner, the contents of the media data are used to generate the data identifier.

In another embodiment, a data identifier for the media data may be generated by the server storing the media data. The server may communicate the data identifier to processing system 1202. In yet other embodiments, an identifier generation system/service may be used to generate the data identifier for the media data selected by the user. The generated data identifier may be provided to processing system 1202.

The media data corresponding to the media key may be stored in encrypted form. As a result, the server storing the media data may not be able to determine the contents of the media data. Processing system 1202 may be configured to choose an encryption key for encrypting the media data prior to storage. Processing system 1202 may also determine a decryption key that may be used to decrypt the encrypted media data. If a symmetric encryption algorithm is used, then the decryption key may be same as the encryption key. The encryption and decryption keys may also be provided to processing system 1202, possibly by a user.

Processing system 1202 may also determine additional information, if any, to be included in the machine readable information for the media key. As previously described, the additional information may include various types of information including metadata related to the media data, contextual information, etc.

Processing system 1202 may be configured to generate a thumbnail image for printing on the media key to be created. As previously described, the thumbnail image may be created such that it provides a human-readable visual representation of the contents of the media data for which the media key is created. The thumbnail image thus provides a visual cue to the user as to the contents of the media data for which the media key is created.

According to an embodiment of the present invention, processing system 1202 is configured to perform processing to generate a fingerprint for a media key during creation of the media key. As depicted in FIG. 12. processing system 1202 may be coupled to a scanner 1220 and a scanner controller 1218. During the generation of a media key, processing system 1202 may cause scanner 1220 to scan a paper sheet (or other article) to be used for generating a media key and collect data points from the scan. The data points are then used to generate a fingerprint for the media key.

In one embodiment, processing system 1202 may generate a set of parameter values (using one of the techniques previously described) and communicate the parameter values to scanner controller 1218. Scanner controller 1218 may then operate scanner 1220 using the parameter values received from processing system 1202. Default parameter values may also be used for performing the scan. Scanner 1202 may scan the sheet to be used as a media key using the techniques described above. Data points collected by scanner 1220 from the scan may be communicated to processing system 1202. Processing system 1202 may then generate a fingerprint for the media key based upon the data points.

In one embodiment, the fingerprint generated for a media key may be stored along with the media data corresponding to the media key. For example, processing system 1202 may communicate a fingerprint generated for a media key to a server storing the media data for the media key. The server may then store the fingerprint along with the media data for the media key.

In another embodiment, processing system 1202 may communicate the data points received from scanner 1220 to the server for storage. For example, in one embodiment, processing system 1202 may generate a set of one or more scan sites for scanning the media key. Each scan site specifies a surface area. Scanner 1220 may then scan the media key at areas corresponding to each of the scan sites and collect data points for each of the scan sites. Scanner 1220 may communicate the data points to processing system 1202. Processing system 1202 may then send information identifying the scan sites and the data points for each of the scan sites to a server for storage. The data points may be stored along with the media data for the media key. These data points for the scan sites may be subsequently used for authenticating the media key, as described below.

Processing system 1202 is configured to generate machine readable information to be associated with the media key. In one embodiment, the machine readable information may comprise the data identifier that may be used to access the media data, a decryption key that may be used to decrypt the encrypted media data, fingerprint information that may be used to retrieve a fingerprint for the media key, parameter values information, if any, used for generating the reference fingerprint for the media key, and additional information.

Processing system 1202 may then generate a media key using the paper sheet that has been fingerprinted. In one embodiment, processing system 1202 is configured to forward the thumbnail image and the machine readable information to a media key generator 1214. Media key generator 1214 is then configured to create a physical media key 1216 using the paper sheet. In one embodiment, media key generator 1214 may print the thumbnail image on the paper sheet and associate the machine readable information with the paper sheet that was fingerprinted.

As previously indicated, the machine readable information may be associated with the media key in several different ways. In one embodiment, the machine readable information may be printed on the media key in the form of text, an image, a barcode, etc. In another embodiment, the machine readable information may be written to a tag such as an RFID tag or similar radio enabled storage tag that is then attached to the article, or by updating the memory of an already attached rewritable RFID tag or similar radio enabled storage tag.

The printed paper sheet then serves as a media key that may be used to access media data corresponding to the media key. Other materials such as a plastic sheet, etc. may also be used for generating a media key.

Figure 13:
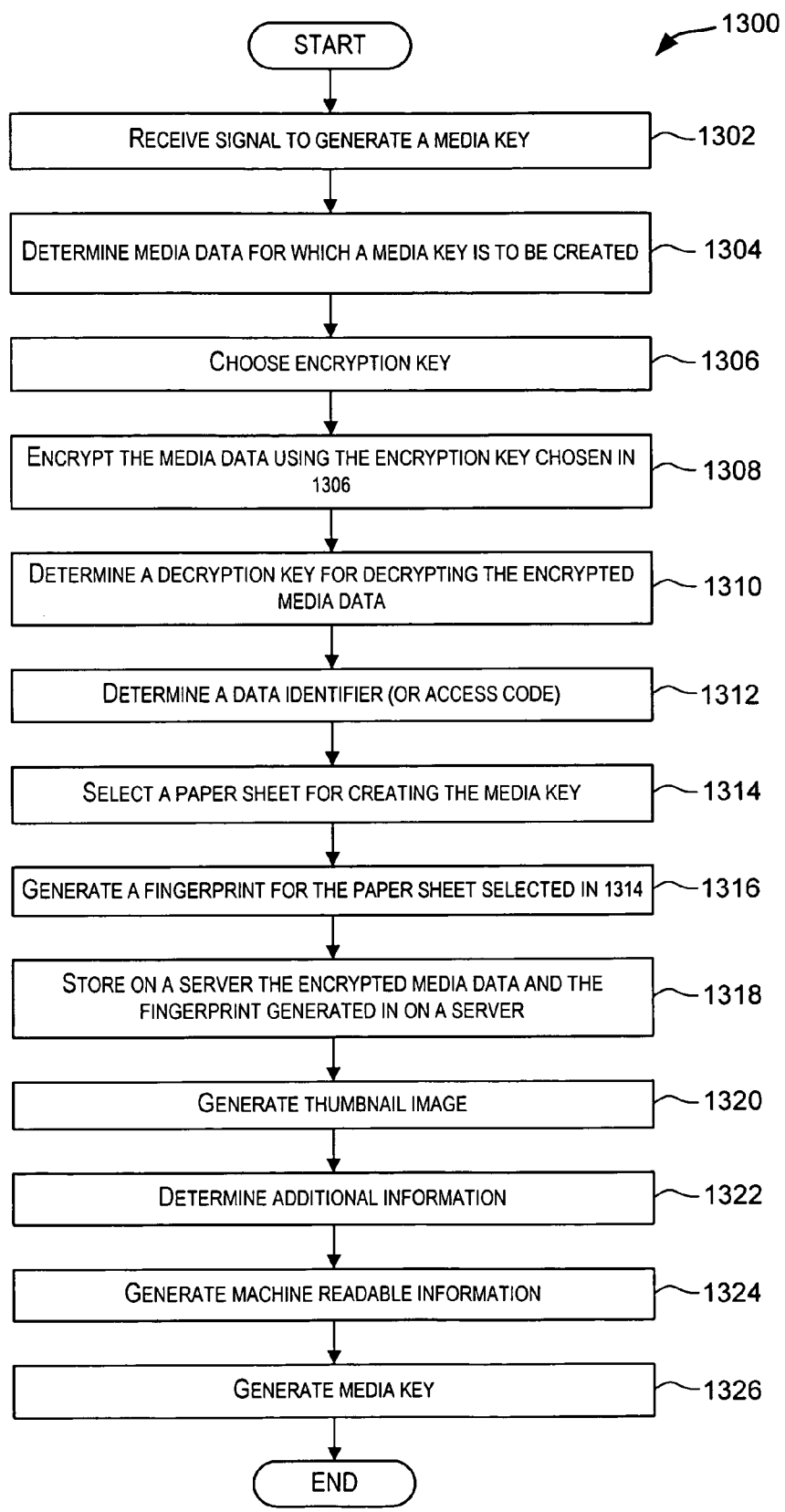
FIG. 13 is a simplified high-level flowchart depicting processing for generating a media key according to an embodiment of the present invention.

FIG. 13 is a simplified high-level flowchart 1300 depicting processing for generating a media key according to an embodiment of the present invention. The processing may be performed by software modules (code, instructions) executed by a processor, hardware modules, or combinations thereof. Flowchart 1300 depicted in FIG. 13 is merely illustrative of an embodiment of the present invention and is not intended to limit the scope of the present invention. Other variations, modifications, and alternatives are also within the scope of the present invention.

The processing depicted in FIG. 13 assumes that a paper sheet is used for generating a media key. Other articles may also be used in alternative embodiments. As depicted in FIG. 13, processing is initiated upon receiving a signal to generate a media key (step 1302). Various events may trigger a signal to generate a media key. The signal may be generated in response to a request received from a user to generate a media key. The signal may also be triggered automatically in response to various events. For example, media key generation may be triggered upon receiving an email, upon detecting presence of voicemail, upon capturing an image, etc. For example, whenever a voice mail is left, a signal may be triggered to generate a media key for the voice mail. The signal to generate a media key may be generated by a device, an apparatus, process, program, application, etc.

The media data for which a media key is to be generated is determined (step 1304). In one embodiment, a user may identify the media data for which a media key is to be created. In other embodiments, the media data may be identified by a device, system, or process, etc. with or without any user involvement. For example, if the media data represents a voice mail on a phone system, the system may be configured to automatically select the voice mail for media key creation.

An encryption key for encrypting the media data is then chosen (step 1306). This may automatically be chosen by the processing system or may be provided by a user. The media data is then encrypted using the encryption key chosen in 1306 (step 1308). A decryption key that may be used to decrypt the encrypted media data is determined (step 1310). If a symmetric encryption scheme is used to encrypt the media data in 1308, then the decryption key may be same as the encryption key chosen in 1306.

A data identifier (or access code) is then determined for the media key (step 1312). The data identifier is generated such that it can be used to access the media data for which the media key is being generated. For example, the data identifier may point to storage location where the media data is stored. For example, if the media data corresponding to the media key is stored in a file on a server, the data identifier generated in 1314 may be used to locate the file on the server.

Different techniques may be used to generate a data identifier. The data identifier may be generated by different systems such as a system that is configured to generate media keys, a server such as a storage server where the media data is stored, a centralized identifier generator system/service, and other systems. In one embodiment, the data identifier may be generated using the media data for which a media key is being created. For example, a data identifier may be generated by calculating a cryptographic hash (e.g., an MD5 or SHA1 hash) for the media data. Cryptographic hash functions create unique data identifiers. If the media data is encrypted, then the data identifier is generated using the encrypted media data. Other techniques that do not use the media data itself may also be used to determine a data identifier.

Using the media data itself to generate the hash which is used as the data identifier guarantees, in almost all instances, that the data identifier is unique for that media data. This eliminates the need for getting identifiers from a central server in order to avoid collisions or identifier reuse. It should be noted that other techniques for creating unique identifiers may also be used for generating a data identifier. These techniques may use the media data or its related attributes or other information to generate unique values that are then used as data identifiers. For instance, using time and date, a unique username, email address, or other information and combinations thereof may be used. A cryptographic hash may be calculated for the information to generate a unique identifier that points uniquely to the media data.

A paper sheet is then selected for creating the media key (step 1314). In alternative embodiments, other articles (e.g., a plastic card) may also be chosen for creating a media key.

A fingerprint is then generated for the paper sheet selected in 1314 (step 1316). Various functions may be performed as part of step 1316. In one embodiment, a scanner may scan a surface of the paper sheet using a light beam and collect data points representing light scattered by the paper sheet surface. These data points may then be communicated to a processing system that generates a fingerprint for the paper sheet based upon the data points.

In one embodiment, one or more scan-related parameter values may be specified by the processing system. The parameter values may, for example, specify an area of the paper sheet to be scanned. This scan area may comprise of one or more areas of the paper sheets that may be contiguous, non-contiguous, or even partially overlapping. The scanner may be operated using these parameter values. For example, the scanner may scan and collect data points for the area of the paper sheet specified by the parameter values. Data points captured by the scanner may then be communicated to a processing system that generates a fingerprint for the paper sheet based upon the data points.

The encrypted media data and the fingerprint generated in 1316 are then stored such that they can be subsequently accessed (step 1318). In one embodiment, the encrypted media data and the fingerprint are uploaded to a server for storage. The media data and the fingerprint may be stored in a memory location that is accessible using the data identifier determined in 1312.

In some embodiments, the data identifier may be determined after uploading the encrypted media data and the fingerprint (i.e., step 1312 may be performed after step 1318). For example, the encrypted media data and the fingerprint may be uploaded to some memory storage location and then a data identifier may be generated that can be used to access the encrypted media data and the fingerprint from the memory storage location.

In embodiments where a specific set of parameter values are used for controlling the scanner during collection of data points that are used for the fingerprint generation, the set of parameter values may also be stored on the server along with the encrypted media data and the fingerprint.

A thumbnail image may then be generated for the media key (step 1320). As previously described, the thumbnail image may be created such that it provides a human-readable visual representation indicative of the contents of the media data for which the media key is created. The thumbnail image provides a visual cue to the user as to the contents of the media data corresponding to the media key being created.

Additional information, if any, for the media key may be determined (step 1322). The additional information may include a variety of information as previously described.

Machine readable information to be associated with the media key is then generated (step 1324). Machine readable information may comprise information related to the data identifier determined in 1312, the decryption key determined in 1310, the fingerprint generated in 1316, and/or the additional information determined in step 1322. In one embodiment, the machine readable information may encode the fingerprint generated in 1316. If a specific set of parameter values were used to scan the paper sheet for obtaining the fingerprint, the machine readable information may also comprise information that enables the retrieval of the set of parameter values. In one embodiment, the set of parameter values are encoded in the machine readable information (in which case the set of parameter values need not be stored on a server). In other embodiments, the parameter values information may be used to retrieve the set of parameter values from storage.

The machine readable information generated in 1324 may take various forms. In one embodiment, a machine readable identifier may be in the form of text, an image, a barcode (e.g., a QR code which is a 2-dimensional barcode), a glyph, and the like. The machine readable information may also be in the form of information that is stored on an RFID tag or other radio enabled storage tag.

A media key is then generated using the paper sheet selected in 1314 (step 1326). In one embodiment, the thumbnail image generated in 1320 is printed on the paper sheet and the machine readable information generated in 1324 is associated with the selected paper sheet. The paper sheet then serves as a media key that can be used to access corresponding media data.

There are various ways in which the machine readable information is associated with the paper sheet. In one embodiment, the machine readable information is printed on the paper sheet. In another embodiment, the machine readable information is written to an RFID tag or similar radio enabled storage tag that is then attached to the article, or by updating the memory of an already attached rewritable RFID tag or similar radio enabled storage tag.

Other information (e.g., reference 1112 in FIG. 11), if any, may also be printed on the paper sheet. Color or symbols or other identifiers may be printed on the media key to indicate information related to the contents of the media data corresponding to the media key. Different layouts may be used for printing information on the paper sheet to create a media key. For example, in one embodiment, the thumbnail image and the machine readable information may be printed on the same side, while in another embodiment the thumbnail image may be printed on one side and the machine readable information is printed on a second side of the media key.

Figure 14:
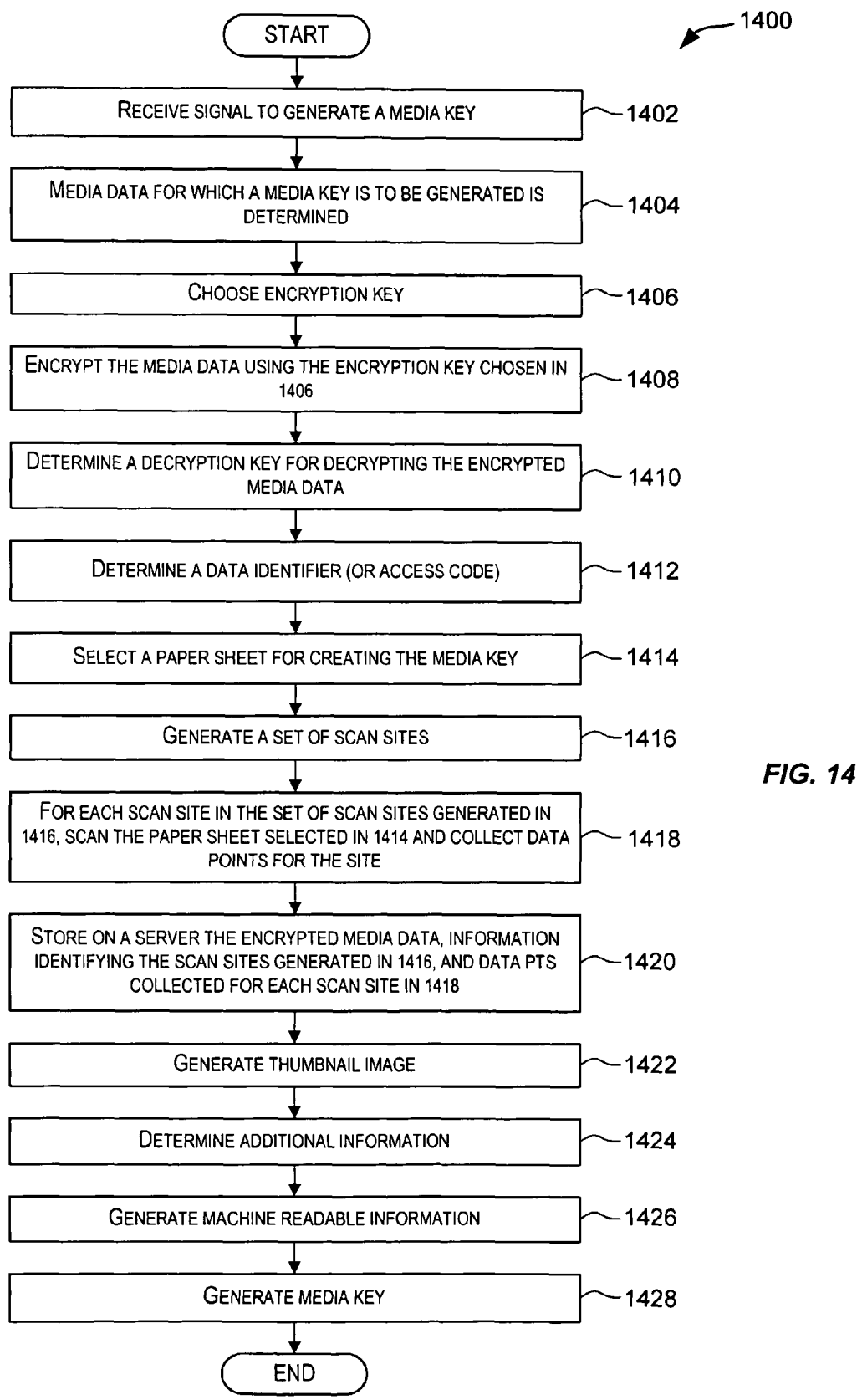
FIG. 14 is another simplified high-level flowchart depicting processing for generating a media key according to an embodiment of the present invention.

FIG. 14 is another simplified high-level flowchart 1400 depicting processing for generating a media key according to an embodiment of the present invention. The processing may be performed by software modules (code, instructions) executed by a processor, hardware modules, or combinations thereof. Flowchart 1400 depicted in FIG. 14 is merely illustrative of an embodiment of the present invention and is not intended to limit the scope of the present invention. Other variations, modifications, and alternatives are also within the scope of the present invention.

Steps 1402, 1404, 1406, 1408, 1410, 1412, and 1414 depicted in FIG. 14 are similar to steps 1302, 1304, 1306, 1308, 1310, 1312, and 1314 of flowchart 1300 depicted in FIG. 13 and described above. A set of scan sites is then generated (step 1416). Each scan site identifies a surface area. The scan sites in the set may be contiguous or noncontiguous, overlapping or not, and may be of different shapes and sizes. The set of scan sites may be generated by processing system 1202. The scan sites may be contiguous or non-contiguous, overlapping or not, and may be different in shape and size.

Various techniques may be used for generating the scan sites. In one embodiment, the scan sites may be provided by a user. In another embodiment, the scan sites may be generated using a number sequence generator such as a pseudo-random number generator, a cellular automaton, and the like.

In one embodiment, the set of scan sites are generated based upon the media key being generated. For example, the shape and size of the media key may be taken into consideration when generating the set of scan sites. In another embodiment, the set of scan sites may be generated independent of the media key. For example, a set of scan sites may be generated without considering any particular media key and used during the generation of multiple media keys. The scan sites may even be generated independent of the media key generation process. For example, a set of scan sites may be configured and then made available for use during media key creation. As previously indicated, various techniques may be used for generating the scan sites.

For each scan site in the set of scan sites determined in 1416, the scan site is scanned using a scanner and data points collected from the scanning (step 1418). One or more data points may be collected for each scan site.

The encrypted media data, information identifying the scan sites determined in 1416, and the data points collected for each scan site are then stored (step 1420). In one embodiment, the information may be uploaded and stored on a server. In one embodiment, the information is stored such that it is retrievable using the data identifier determined in 1412.

Steps 1422 and 1424 are similar to steps 1320 and 1322 depicted in FIG. 13 and described above. Machine readable information to be associated with the media key is then generated (step 1426). Machine readable information may comprise information related to the data identifier determined in 1412, the decryption key determined in 1410, and/or the additional information determined in step 1424. The machine readable information generated in 1426 may take various forms. In one embodiment, a machine readable identifier may be in the form of text, an image, a barcode (e.g., a QR code which is a 2-dimensional barcode), a glyph, and the like. The machine readable information may also be in the form of information that is stored on an RFID tag or other radio enabled storage tag.

A media key is then generated using the paper sheet selected in 1414 (step 1428). In one embodiment, the thumbnail image generated in 1422 is printed on the paper sheet and the machine readable information generated in 1426 is associated with the selected paper sheet. The paper sheet then serves as a media key that can be used to access corresponding media data. As previously described, there are various ways in which the machine readable information may be associated with the paper sheet.

Other information (e.g., reference 1112 in FIG. 11), if any, may also be printed on the paper sheet. Color or symbols or other identifiers may be printed on the media key to indicate information related to the contents of the media data corresponding to the media key. Different layouts may be used for printing information on the paper sheet to create a media key. For example, in one embodiment, the thumbnail image and the machine readable information may be printed on the same side, while in another embodiment the thumbnail image may be printed on one side and the machine readable information is printed on a second side of the media key.

In some embodiments, instead of storing data points collected for each scan site (as depicted in FIG. 14), a fingerprint may be generated for each scan site based upon the data points collected for that scan site in 1418. Accordingly, fingerprints corresponding to a set of scan sites are stored for a media key when the media key is created. These fingerprints are then used for authentication purposes as described below.

A media key generated as described above may then be used to access media data for which the media key is created. According to an embodiment of the present invention, prior to allowing access to the media data, the media key itself may be verified or authenticated using a fingerprint generated for the media key or using data points collected for the media key at the time of creation of the media key. In this manner, the media key provides a secure and verifiable mechanism for accessing the media data.

Figure 15:
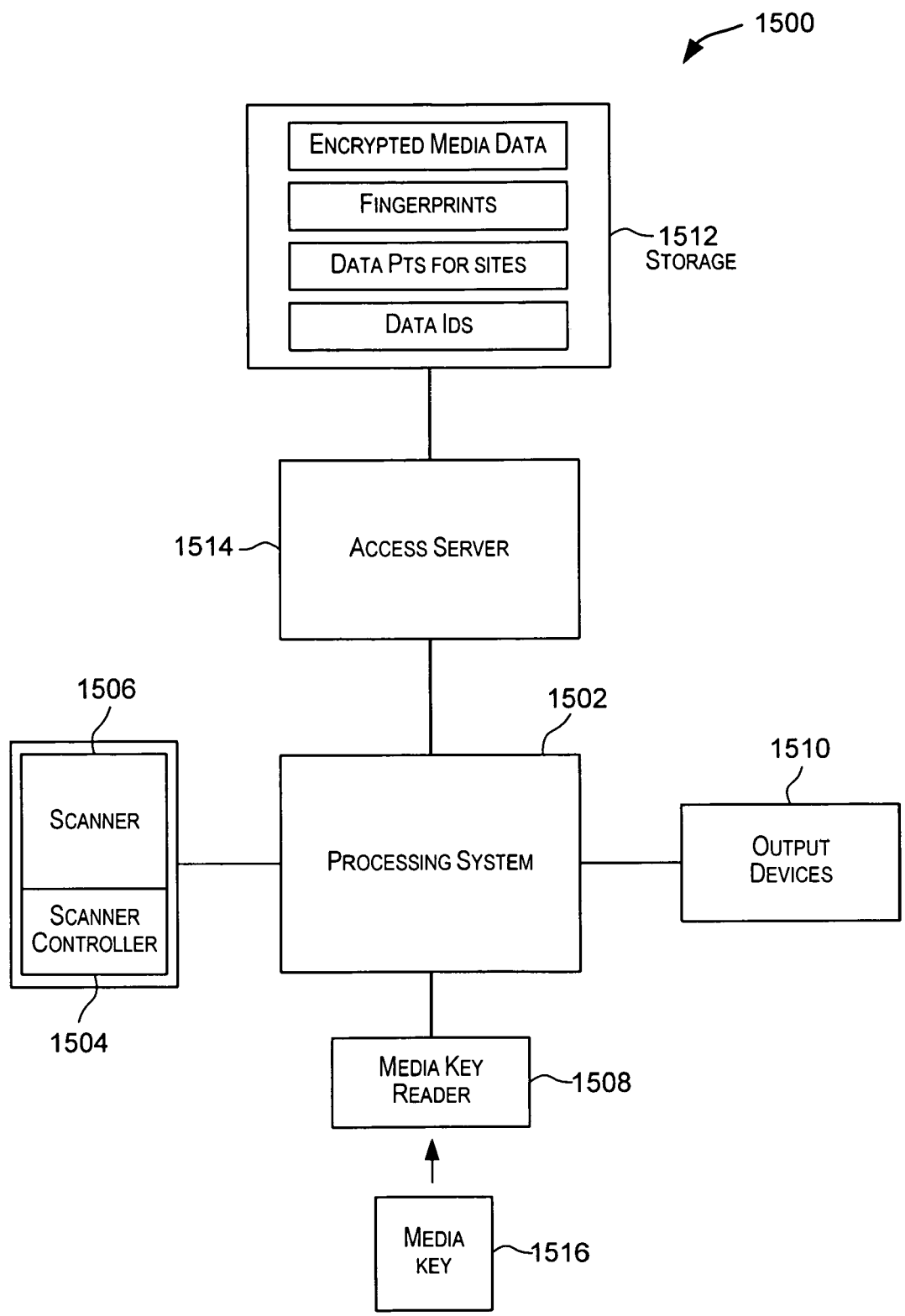
FIG. 15 is a simplified block diagram of a system that may be used to access media data using a media key according to an embodiment of the present invention.

FIG. 15 is a simplified block diagram of a system 1500 that may be used to access media data using a media key according to an embodiment of the present invention. System 1500 depicted in FIG. 15 is merely illustrative of an embodiment incorporating the present invention and is not intended to limit the scope of the invention as recited in the claims. One of ordinary skill in the art would recognize other variations, modifications, and alternatives.

Storage 1512 may store media data (encrypted) corresponding to one or more media keys, fingerprints generated for media keys, scan sites and corresponding data points collected when the media keys were created, and possibly data identifiers. Access server 1514 is configured to regulate access to data stored by storage 1512. In one embodiment, access server 1514 may be incorporated into processing system 1502.

In order to access media data corresponding to a media key 1516, a user may present media key 1516 to media key reader 1508. Media key reader 1508 is configured to read the machine readable information associated with media key 1516. For example, if the machine readable information is in the form of a barcode, media key reader 1508 may be a scanner or barcode reader that is configured to read the barcode. Media key reader 1516 may also be an RFID reader that is capable of reading machine readable information stored in an RFID tag attached to the media key. The machine readable information read from the media key is forwarded to processing system 1502.

According to an embodiment of the present invention, media data corresponding to a media key is made accessible only upon successful authentication of the media key. Various techniques may be used to authenticate the media key.

In one embodiment, processing system 1502 is configured to retrieve a data identifier and a decryption key from the machine readable information associated with media key 1516. The media key is rescanned using scanner 1506 and scanner controller 1504 and a fingerprint is generated by processing system 1502 based upon the data points collected during the rescan. Processing system 1502 then communicates the data identifier, the decryption key, and the fingerprint to access server 1514 for performing authentication.

Based upon the data identifier received from processing system 1502, access server retrieves a reference fingerprint generated for media key 1516 when the media key was created. The reference fingerprint may be stored in storage 1512. Access server 1514 then compares the fingerprint received from processing system 1502 with the reference fingerprint stored for the media key to see if they match. The media key is deemed authenticated if the reference fingerprint for the media key matches the fingerprint generated for the media key from the rescan. Upon successful authentication, access server 1514 provides access to the media data corresponding to the media key. If the media data is encrypted, then the decryption key determined from the machine readable information associated with the media key may be used to decrypt the encrypted media data.

As previously described, according to an embodiment of the present invention, when a media key is created, information identifying a set of scan sites and the corresponding data points collected for each scan site when the media key was created may be stored. This information may be stored in storage 1512. In this embodiment, processing system 1502 is configured to retrieve a data identifier and a decryption key from the machine readable information associated with media key 1516. Processing system 1502 then sends a request to access server 1514 requesting a subset of the scan sites that were generated when the media key was created. The request may include the data identifier determined from the machine readable information read from the media key.

Upon receiving the request, using the data identifier, access server 1514 determines a set of scan sites stored corresponding to the data identifier. From this set of scan sites, access server 1514 identifies a subset of the scan sites and sends information to processing system 1502 identifying the subset. The subset of scan sites are then rescanned using scanner 1506 and data points collected for each site in the subset. The data points collected from the rescan are then communicated to access server 1514. For each site in the subset, access server 1514 then compares the data points collected from that site during the rescan and the data points collected for that site when the media key was created. For each site in the subset, if the data points collected for that site from the rescan match the data points collected for that site when the media key was created, then the media key is deemed to be successfully authenticated. Upon successful authentication, access server 1514 provides access to the media data corresponding to the media key. If the media data is encrypted, then the decryption key determined from the machine readable information associated with the media key may be used to decrypt the encrypted media data.

One or more actions may be performed using the media data accessed using a media key. For example, the accessed media data may be output via output devices 1510.

Figure 16:
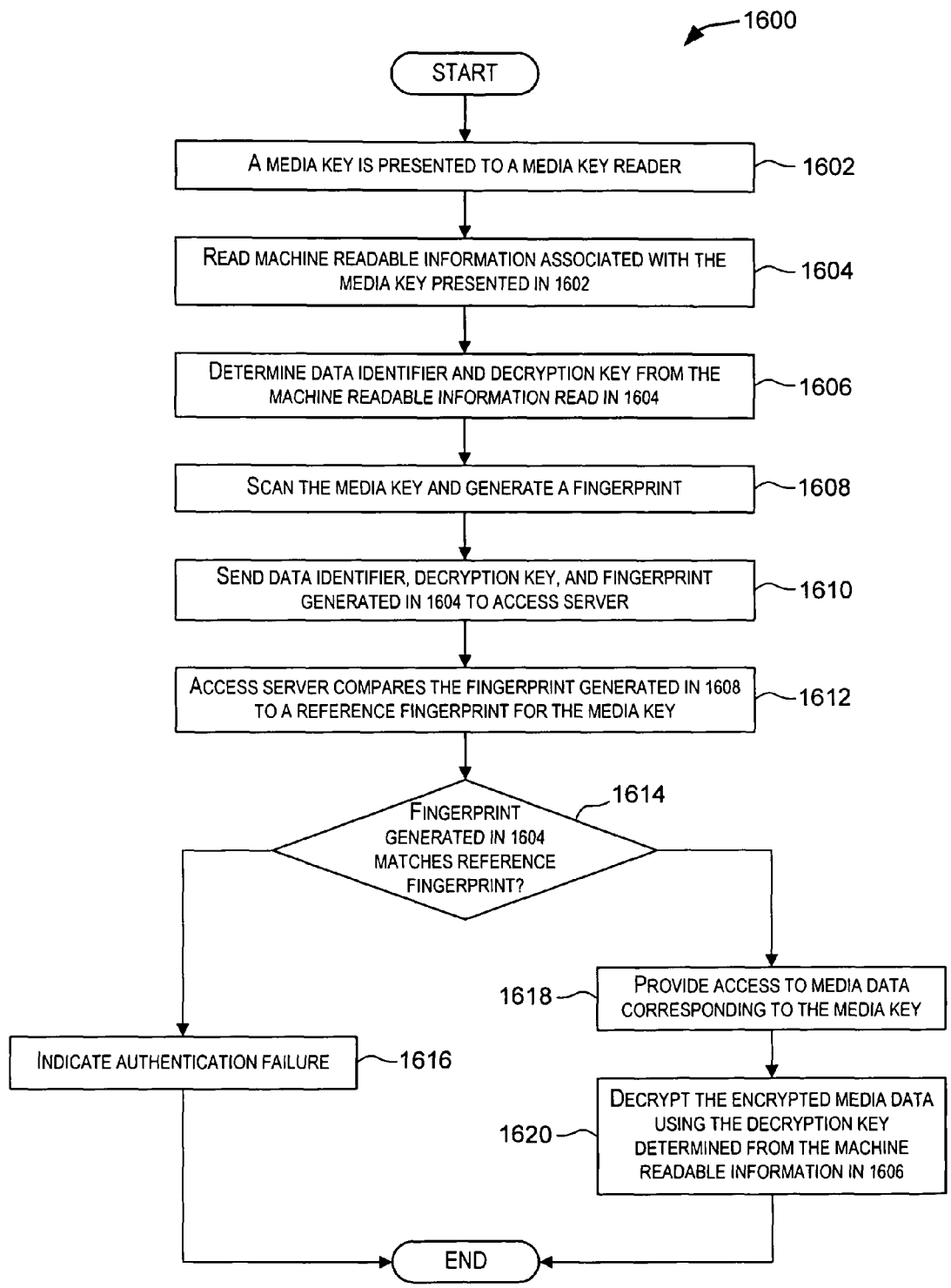
FIG. 16 is a simplified high-level flowchart depicting a method of using a media key to access media data according to an embodiment of the present invention.

FIG. 16 is a simplified high-level flowchart 1600 depicting a method of using a media key to access media data according to an embodiment of the present invention. The processing depicted in FIG. 16 may be performed by software modules (code, instructions) executed by a processor, hardware modules, or combinations thereof. Flowchart 1600 depicted in FIG. 16 is merely illustrative of an embodiment of the present invention and is not intended to limit the scope of the present invention. Other variations, modifications, and alternatives are also within the scope of the present invention.

As depicted in FIG. 16, processing is initiated when a media key is presented to a media key reader in order to access media data for the media key (step 1602). The media key reader reads the machine readable information associated with the media key presented in 1602 (step 1604). The machine readable information may then be communicated to a data processing system for further processing.

A data identifier and a decryption key is determined from the machine readable information read in 1604 (step 1606). In some embodiments, if the machine readable information comprises information related to a set of parameter values, then the set of parameter values may also be retrieved in 1606.

The media key is then scanned using a scanner and a fingerprint generated based upon data points collected from the scan (step 1608). The data points represent data collected as a result of light scattered from the surface of the media key during the rescan. In one embodiment, if a set of parameter values are retrieved in 1606 from the machine readable information, then the scanner is operated using the set of parameter values.

The fingerprint generated in 1608, and the data identifier and decryption key determined in 1606 are then communicated to an access server (step 1610). The access server then compares the fingerprint generated in 1608 to a reference fingerprint stored for the media key to determine if the fingerprints match (step 1614). The data identifier read from the media key may be used to locate and access the reference fingerprint for the media key. The reference fingerprint may represent the fingerprint generated for the media key when the media key was created. The two fingerprints may be considered to match if the degree of similarity between the two fingerprints exceeds a user-configurable value. Accordingly, the fingerprints may be deemed to match even if they do not exactly match.

The results of the comparison are then checked to see if the fingerprints match (step 1614). If it is determined in 1614 that the fingerprint generated in 1608 does not match the reference fingerprint for the media key, then authentication of the media key is considered to have failed. Information may be output indicating the authentication failure (step 1616). In this scenario, processing is stopped and access to media data corresponding to the media key is not permitted.

If it is determined in 1614 that the fingerprint generated in 1608 matches the reference fingerprint stored for the media key, then authentication of the media key is considered to have succeeded. Upon successful authentication, access is provided to the media data corresponding to the media key (step 1618). As part of 1618, the media data may be accessed from its storage location and provided to a requestor.

The data identifier determined from the machine readable information may be used to locate and access the media data corresponding to the media key. In one embodiment, the data identifier may identify the storage location of the data. In another embodiment, a web server may be provided that is configured to retrieve and respond with the media data when provided a specific data identifier. An example of such a web server is the Flickr website (http://www.flickr.com/) which provides access to individual images if the image identifier (ID) is specified. For instance, an identifier such as "http://static.flickr.com/23/41302953_d1aa3c791d.jpg" points to an image where "23/41302953_d1aa3c791d.jpg" is the name of the image or the media identifier. Accordingly, image media data may be uploaded to the Flickr server which generates an identifier (e.g., 23/41302953_d1aa3c791d.jpg) that points to the image and would be the same as the Flickr name. Then, every application that reads those media keys would prepend "http://static.flickr.com/" to the data identifier in order to access that image through the web. Other techniques may also be used to access media data based upon a data identifier.

The media data, if encrypted, may be decrypted using a decryption key (step 1620). The decryption key determined from the machine readable information in 1606 may be used to decrypt the encrypted media data.

Figure 17:
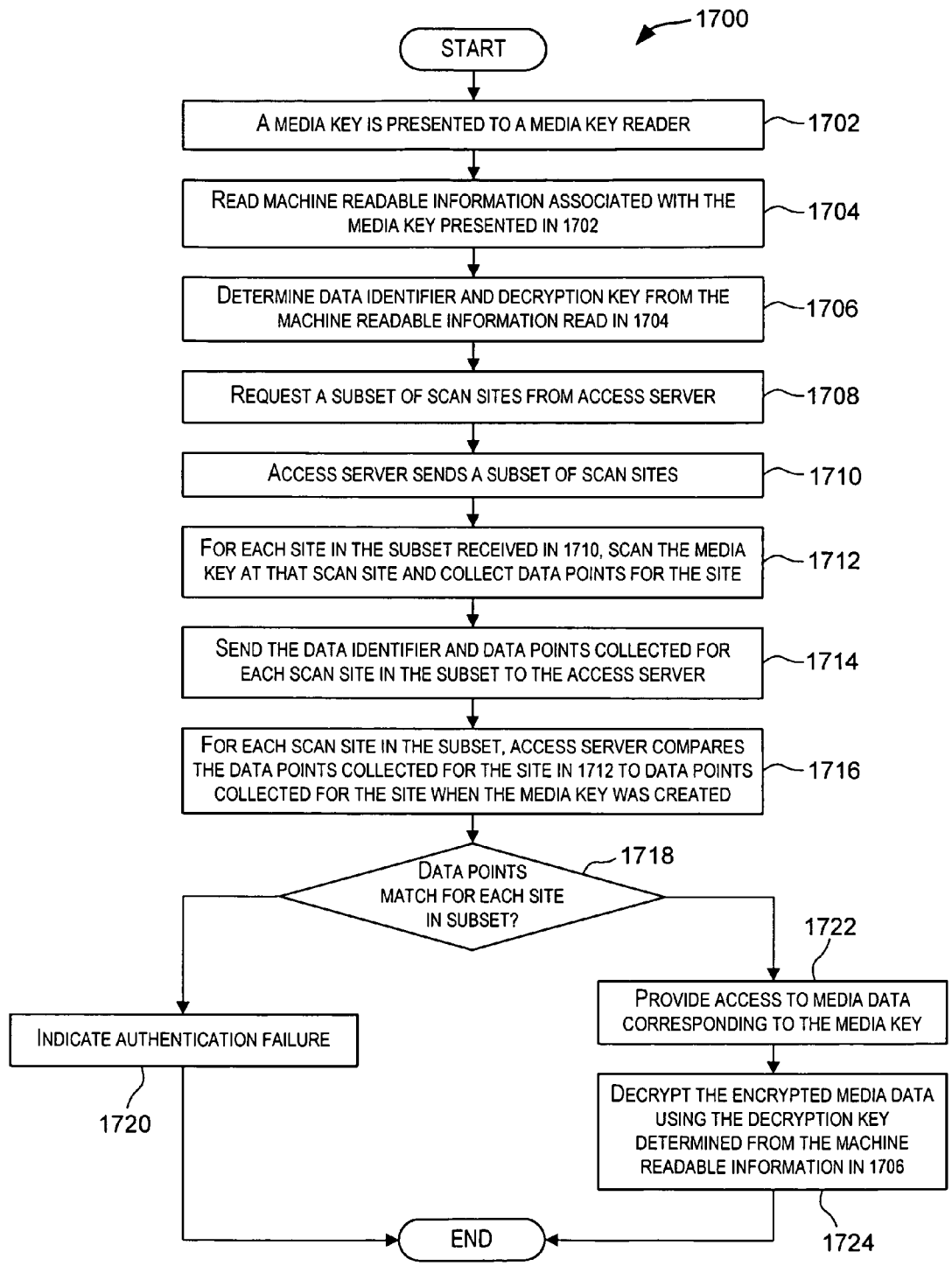
FIG. 17 is a simplified high-level flowchart depicting a method of using a media key to access media data according to an embodiment of the present invention.

FIG. 17 is a simplified high-level flowchart 1700 depicting a method of using a media key to access media data according to an embodiment of the present invention. The processing depicted in FIG. 17 may be performed by software modules (code, instructions) executed by a processor, hardware modules, or combinations thereof. Flowchart 1700 depicted in FIG. 17 is merely illustrative of an embodiment of the present invention and is not intended to limit the scope of the present invention. Other variations, modifications, and alternatives are also within the scope of the present invention.

Steps 1702, 1704, and 1706 depicted in FIG. 17 are similar to steps 1602, 1604, and 1606 depicted in FIG. 16 and described above. As previously described, according to an embodiment of the present invention, when a media key is created, information identifying a set of scan sites and the corresponding data points collected for each scan site when the media key was created may be stored. In the embodiment depicted in FIG. 17, a request is sent from a processing system to an access server for a subset of the set of scan sites used when the media key was created (step 1708). The request may include the data identifier determined in 1706.

In one embodiment, upon receiving the request, the access server uses the data identifier in the request to retrieve information identifying a set of scan sites that were used when the media key corresponding to the data identifier was created. From this set, the access server identifies a subset of scan sites and sends information identifying the subset to the source of the request (step 1710).

Various different techniques may be used to identify the subset of scan sites. In one embodiment, identification of the subset may be dependent upon the media key, for example, the process of identifying the subset may take into consideration the shape and size of the media key. In another embodiment, the selection of the subset may be independent of the specific media key. Various techniques such as randomizers, cellular automaton, etc. may be used to select the one or more scan sites to be included in the subset from the scan sites used when the media key was created.

For each scan site in the subset of sites received from the access server, the media key is scanned using the scanner and a set of data points collected for each scan site (step 1712). The data points collected in 1712 along with the data identifier identified in 1706 are then communicated to the access server for authentication purposes (step 1714).

For each scan site in the subset of scan sites, the access server compares the set of data points collected for that scan site in 1712 to data points collected and stored for that scan site when the media key was created (step 1716). The data points collected for the media key when the media key was created may be stored in a memory location accessible to the access server.

A check is then made to see if, for each scan site in the subset, the set of data points collected in 1712 for the scan sites matches the data points collected for that scan site when the media key was created (step 1718). If the corresponding data points match for each of the scan sites in the subset, then the media key is considered to be successfully authenticated. Else, the media key is considered to have failed authentication. In case of an authentication failure, processing is stopped and access to media data corresponding to the media key is not permitted. Information may be output indicating the authentication failure (step 1720).

Upon successful authentication, access is provided to the media data corresponding to the media key (step 1722). As part of 1722, the media data may be accessed from its storage location and provided to a requester. The data identifier determined from the machine readable information is used to locate and access the media data corresponding to the media key. The media data, if encrypted, may be decrypted using a decryption key (step 1724). The decryption key determined from the machine readable information in 1706 may be used to decrypt the encrypted media data.

One or more operations or actions may be performed using the decrypted media data or a portion thereof. For example, the media data may be output via one or more output devices. Various other actions may also be performed such as communicating the media data, etc. The media data retrieved for the media key may comprise data of one or more types including text information, image information, audio information, video information, etc. or combinations thereof.

In the embodiment depicted in FIG. 17 and described above, the data points are compared for the scan sites. As previously discussed, in some embodiments, when a media key is created, instead of storing data points collected for each scan site, a fingerprint is generated for each scan site based upon the data points collected for that scan site. Accordingly, fingerprints corresponding to a set of scan sites are stored for a media key when the media key is created. In such an embodiment, in step 1716, access server may generate a fingerprint for each scan site in the subset based upon the data points collected for that scan site in 1712. For each scan site in the subset, the fingerprint generated for that scan site based upon the data points collected for that scan site in 1712 is then compared to the fingerprint generated and stored for that scan site when the media key was created. The media key is successfully authenticated if, for each scan site in the subset, the fingerprint generated for that scan site based upon the data points collected for that site in 1712 matches the fingerprint stored for that scan site when the media key was created.

The subset of scan sites determined by the access server may change from one authentication to the next. For example, the access server may randomly choose the scan sites to be included in the subset for an authentication. As a result, the identity of the scan sites in the subset to be used for an authentication cannot be easily determined by a potential "attacker" of the authentication system. Since the attacker is not aware of the sites in the subset, the attacker also as a result does not know which areas of the media key to abrade in order to fool the authentication system (assuming that abrading the entire media key destroys the utility of the media key and is not something the attacker desires). This method thus helps to combat fraudulent actions.

In the manner described above, fingerprints or data points collected from scanning a media key may be used to verify the authenticity of the media key. The media key thus provides a secure and verifiable token for accessing data.

A media key may also be used as an access control mechanism for subsets of data, for example, for subsets of stored document data. An access server may be provided a specific set of paper fingerprints and instructed to only return certain bytes ranges of the stored document based upon the fingerprint of the accessing media key. For example, one media key may be allowed to retrieve pages 1-12 of the document, and another media key may be allowed to retrieve all the pages of the document. The access server itself does not know of the document contents but can still restrict access to holders of specific media keys.

In alternative embodiments, the access server may return different information to different media keys. For example, after a failed attempt to retrieve the contents, the access server may return false contents to the requestor (or attacker).

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method of processing an article, the method comprising: determining a set of parameter values; directly operating a scanner using the set of parameter values to obtain a set of data points for the article, the set of data points obtained when a light beam scatters from a surface of the article; generating a fingerprint for the article based upon the set of data points; and associating machine readable information with the article, wherein the set of parameter values are retrievable using the machine readable information.

2. The method of claim 1 wherein the fingerprint is retrievable using the machine readable information associated with the article.

3. The method of claim 1 wherein the machine readable information encodes the set of parameter values and the fingerprint.

4. The method of claim 1 further comprising encrypting the set of parameter values and the fingerprint, and wherein the machine readable information comprises an encrypted form of the set of parameter values and the fingerprint.

5. The method of claim 1 wherein the set of parameter values comprises one or more values identifying an area of the article to be scanned.

6. The method of claim 5 wherein:
the area of the article to be scanned comprises at least a first area and a second area; and
the set of parameter values comprise a starting coordinate of the first area and a starting coordinate of the second area.

7. The method of claim 1 wherein the set of parameter values comprises a parameter value related to at least one of an intensity of the light beam, an angle of incidence of the light beam to the surface of the article, a position of a detector configured to detect scattering of the light beam from the surface of the article, an area of the article to be scanned, or a scan rate.

8. The method of claim 1 wherein determining the set of parameter values comprises using a pseudo-random number generator or a cellular automaton to generate one or more parameter values in the set of parameter values.

9. A method of processing an article, the method comprising: reading machine readable information associated with the article; obtaining a set of parameter values using the machine readable information, wherein the set of parameter values comprises one or more parameter values used for generating a first fingerprint for the article; directly operating a scanner using the set of parameter values to obtain a set of data points for the article, the set of data points obtained when a light beam scatters from a surface of the article; and generating a second fingerprint for the article based upon the set of data points.

10. The method of claim 9 wherein:
the machine readable information encodes the set of parameter values; and
obtaining the set of parameter values comprises determining the set of parameter values from the machine readable information.

11. The method of claim 10 wherein:
the machine readable information encodes the set of parameter values in encrypted form; and
determining the set of parameter values from the machine readable information comprises decrypting the encrypted form of the set of parameter values.

12. The method of claim 9 wherein obtaining the set of parameter values comprises using a portion of the machine readable information to access the set of parameter values from a database.

13. The method of claim 9 wherein obtaining the set of parameter values comprises:
hashing a portion of the machine readable information to obtain a hash result; and
determining the set of parameter values from the hash result.

14. The method of claim 9 wherein obtaining the set of parameter values comprises:
seeding a number sequence generator;

generating a first parameter value using the number sequence generator; and generating a second parameter value using the number sequence generator after generating the first parameter value.

15. The method of claim 9 further comprising:

comparing the second fingerprint with the first fingerprint to determine if the second fingerprint matches the first fingerprint.

16. The method of claim 15 wherein the first fingerprint is obtained using the machine readable information.

17. A system comprising:

a scanner configured to obtain a set of data points for an article by directly scanning the article using a set of parameters; and a processing system configured to:

generate a fingerprint for the article based upon the set of data points; and cause machine readable information to be associated with the article, wherein the set of parameter values are retrievable using the machine readable information.

18. The system of claim 17 wherein the machine readable information encodes the set of parameter values and the fingerprint.

19. The system of claim 17 wherein the set of parameter values comprises one or more values identifying an area of the article to be scanned.

20. The system of claim 17 wherein the set of parameter values comprises a parameter value related to at least one of an intensity of the light beam, an angle of incidence of the light beam to the surface of the article, a position of a detector configured to detect scattering of the light beam from the surface of the article, an area of the article to be scanned, or a scan rate.

21. A system comprising:

a reader configured to read machine readable information associated with an article;

a processing system configured to obtain a set of parameter values using the machine readable information, wherein the set of parameter values comprises one or more parameter values used for generating a first fingerprint for the article; and a scanner configured to directly obtain a set of data points for the article by using the set of parameter values, the set of data points obtained when a light beam scatters from a surface of the article; and wherein the processing system is configured to generate a second fingerprint for the article based upon the set of data points.

22. The system of claim 21 wherein:

the machine readable information encodes the set of parameter values; and the processing system is configured to obtain the set of parameter values from the machine readable information.

23. The system of claim 21 wherein obtaining the set of parameter values comprises using a portion of the machine readable information to access the set of parameter values from a database.

24. The system of claim 21 wherein the processing system is configured to:

hash a portion of the machine readable information to obtain a hash result; and determine the set of parameter values from the hash result.

25. The system of claim 21 wherein the processing system is configured to:

seed a number sequence generator;

generate a first parameter value using the number sequence generator; and generate a second parameter value using the number sequence generator after generating the first parameter value.

26. The system of claim 21 wherein the processing system is configured to:

obtain the first fingerprint using the machine readable information; and compare the second fingerprint with the first fingerprint to determine if the second fingerprint matches the first fingerprint.

* * * * *